(12) United States Patent
Jung et al.

(10) Patent No.: US 12,428,013 B2
(45) Date of Patent: Sep. 30, 2025

(54) VEHICLE ELECTRONIC DEVICE AND METHOD FOR PROVIDING NOTIFICATION RELATED TO PARKING ENVIRONMENT BASED ON IMAGE READING

(71) Applicant: THINKWARE CORPORATION, Seongnam-si (KR)

(72) Inventors: Hae Jun Jung, Seongnam-si (KR); Hyeon Seok Oh, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 166 days.

(21) Appl. No.: 18/229,769

(22) Filed: Aug. 3, 2023

(65) Prior Publication Data

US 2024/0157959 A1 May 16, 2024

(30) Foreign Application Priority Data

Aug. 3, 2022 (KR) .......... 10-2022-0096686
Aug. 3, 2023 (KR) .......... 10-2023-0101565

(51) Int. Cl.
| | | |
|---|---|---|
| B60W 50/14 | (2020.01) | |
| G06T 5/70 | (2024.01) | |
| G06T 7/10 | (2017.01) | |
| G06V 10/26 | (2022.01) | |
| G06V 10/34 | (2022.01) | |
| G06V 10/44 | (2022.01) | |
| G06V 20/56 | (2022.01) | |

(52) U.S. Cl.
CPC .............. *B60W 50/14* (2013.01); *G06T 5/70* (2024.01); *G06T 7/10* (2017.01); *G06V 10/26* (2022.01); *G06V 10/34* (2022.01); *G06V 10/44* (2022.01); *G06V 20/56* (2022.01)

(58) Field of Classification Search
CPC .................................................. B60W 50/14
See application file for complete search history.

(56) References Cited

U.S. PATENT DOCUMENTS

| | | | | |
|---|---|---|---|---|
| 2017/0235307 A1* | 8/2017 | Asakura | ............... | G05D 1/0061 701/23 |
| 2018/0330475 A1* | 11/2018 | Tokatyan | ................. | G06T 5/70 |
| 2020/0265654 A1* | 8/2020 | Kapadia | ................. | G07C 5/004 |
| 2021/0263513 A1* | 8/2021 | Liu | ....................... | G05D 1/0225 |
| 2022/0340136 A1* | 10/2022 | Nobutani | .............. | B60W 50/14 |
| 2023/0339280 A1* | 10/2023 | Dudar | ................... | G01G 19/12 |

* cited by examiner

*Primary Examiner* — Travis R Hunnings
(74) *Attorney, Agent, or Firm* — WHDA, LLP

(57) ABSTRACT

The disclosure proposes a method and device for providing notification regarding vehicle state based on image processing/reading, in relation to a method for notifying vehicle state based on GPS and acceleration sensors or G sensors, and a device using the method.

18 Claims, 23 Drawing Sheets

VEHICLE ELECTRONIC DEVICE AND METHOD FOR PROVIDING NOTIFICATION RELATED TO PARKING ENVIRONMENT BASED ON IMAGE READING

TECHNICAL FIELD

The present disclosure relates to a vehicular electronic device, and more particularly, to a vehicular electronic device and a method for improving a function related to a parking environment based on image reading.

BACKGROUND

Safe driving and prevention of a traffic accident are most important in driving a vehicle and to this end. To this end, various auxiliary devices that perform a posture control of a vehicle, a functional control of vehicular constituent devices, and the like and safety devices such as a safety belt, an airbag, and the like are mounted on the vehicle.

In recent years, a dash cam has been installed in the vehicle and data transmitted from various sensors of the vehicle have been stored in the dash cam, and as a result, an accident cause of the vehicle could have been investigated by withdrawing the dash cam installed in the vehicle when an accident of the vehicle occurs.

Portable terminals such as a smartphone and a tablet in which a car dash cam application, a navigation application, or the like may be mounted are used as the apparatuses for a vehicle as described above.

Meanwhile, during parking of a vehicle, various sensors are utilized to assist the driver and detect an impact or towing of the vehicle. However, there have been issues with erroneous detection due to sensor sensitivity, shadows, errors, and other factors.

RELATED DOCUMENT

Patent Document

Korean Patent No. 10-2050671

DETAILED DESCRIPTION

The present disclosure provides a vehicular electronic device and a method for improving accuracy of a function related to a parking environment based on a sensor detection result and an image reading result.

In an aspect, a method performed by a vehicular electronic device comprising performing an image processing procedure from an image acquired by the vehicular electronic device, the image processing procedure including obtaining an image subtraction, determining a state of the vehicle based on the image processing procedure, the state of the vehicle being one of a towing state, a driving state, and a parking state, and providing notification for the determined state of the vehicle is provided.

The image processing procedure includes generating a plurality of cells based on grid-type image segmentation for the image acquired by the vehicular electronic device, and the vehicular electronic device determines the state of the vehicle based on the plurality of cells.

The performing the grid-type image segmentation includes assigning a cell weight to at least one cell among the plurality of cells, and at least one of the at least one cell and the cell weight is determined based on at least one of a state of the vehicle, angle of view of an image, and a location for capturing the image.

The vehicular electronic device determines an unused cell among the plurality of cells that is not to be used to determine the state of the vehicle, and the vehicular electronic device performs at least one of image blurring and image smoothing on the unused cell.

The image processing procedure includes detecting a contour of the image acquired by the vehicular electronic device, and the vehicular electronic device determines the state of the vehicle based on the contour.

The detecting the contour includes extracting a bounding box for an object included in the image acquired by the vehicular electronic device.

The extracting the bounding box includes generating a bounding box in at least one area within the contour included in the image subtraction, the at least one area being larger than a certain size.

The image subtraction is determined based on image downsizing on the image acquired by the vehicular electronic device and based on at least two adjacent frames among a plurality of frames included in the downsized image.

The image subtraction indicates white pixels based on amount of the movement of the vehicle, the vehicular electronic device determines the amount of the movement of the vehicle based on the number of the white pixels, and the vehicular electronic device determines the state based on the amount of the movement.

The vehicular electronic device determines average movement based on the amount of the movement, the average movement is determined based on the amount of change between the amount of the movement of the image subtraction at time t and the amount of the movement of the image subtraction at time t−1.

The vehicular electronic device may determine a confidence interval for the average movement, and the vehicular electronic device may determine the state based on whether the next average movement is greater than the upper bound of the confidence interval.

The vehicular electronic device may generate a trigger signal based on the next average movement being greater than the upper bound of the confidence interval, and the vehicular electronic device uses a portion of the image at the time of generating the trigger signal as a template, and the vehicular electronic device may determine the state based on matching the image and the template.

In another aspect, a vehicular electronic device in a vehicle comprising a camera configured to capture an image, a processor configured to perform an image processing procedure, the image processing procedure including obtaining an image subtraction, to determine a state of the vehicle based on the image processing procedure, the state being one of a towing state, a driving state and a parking state, and to generate a notification regarding the determined state of the vehicle, and a communication module configured to transmit the notification.

The image processing procedure includes generating a plurality of cells based on grid-type image segmentation for the image acquired by the vehicular electronic device, and the vehicular electronic device determines the state of the vehicle based on the plurality of cells.

The performing the grid-type image segmentation includes assigning a cell weight to at least one cell among the plurality of cells, and at least one of the at least one cell and the cell weight is determined based on at least one of a state of the vehicle, angle of view of an image, and a location for capturing the image.

The vehicular electronic device determines an unused cell among the plurality of cells that is not to be used to determine the state of the vehicle, and the vehicular electronic device performs at least one of image blurring and image smoothing on the unused cell.

The image processing procedure includes detecting a contour of the image acquired by the vehicular electronic device, and the vehicular electronic device determines the state of the vehicle based on the contour.

The detecting the contour includes extracting a bounding box for an object included in the image acquired by the vehicular electronic device.

The extracting the bounding box includes generating a bounding box in at least one area within the contour included in the image subtraction, the at least one area being larger than a certain size.

The image subtraction is determined based on image downsizing on the image acquired by the vehicular electronic device and based on at least two adjacent frames among a plurality of frames included in the downsized image.

The image subtraction indicates white pixels based on amount of the movement of the vehicle, the vehicular electronic device determines the amount of the movement of the vehicle based on the number of the white pixels, and the vehicular electronic device determines the state based on the amount of the movement.

The vehicular electronic device determines average movement based on the amount of the movement, the average movement is determined based on the amount of change between the amount of the movement of the image subtraction at time t and the amount of the movement of the image subtraction at time t−1.

The vehicular electronic device may determine a confidence interval for the average movement, and the vehicular electronic device may determine the state based on whether the next average movement is greater than the upper bound of the confidence interval.

The vehicular electronic device may generate a trigger signal based on the next average movement being greater than the upper bound of the confidence interval, and the vehicular electronic device uses a portion of the image at the time of generating the trigger signal as a template, and the vehicular electronic device may determine the state based on matching the image and the template.

Embodiments of the present disclosure may have advantages including the following advantages. However, not all exemplary embodiments of the present disclosure necessarily have all of the advantages of the present disclosure. Thus, the present disclosure should not be construed as limited by its advantages.

In a vehicular electronic device and a method for improving a function related to a parking environment based on image reading according to an embodiment of the present disclosure, it is possible to provide a more precise towing notification by compensating for a sensor error with an image.

In addition, it is possible to identify a parking situation of a vehicle based on an image without a separate fuse box.

DETAILED DESCRIPTION

In what follows, part of embodiments of the present disclosure will be described in detail with reference to illustrative drawings. In assigning reference symbols to the constituting elements of each drawing, it should be noted that the same constituting elements are intended to have the same symbol as much as possible, even if they are shown on different drawings. Also, in describing an embodiment, if it is determined that a detailed description of a related well-known configuration or function incorporated herein unnecessarily obscure the understanding of the embodiment, the detailed description thereof will be omitted.

Also, in describing the constituting elements of the present disclosure, terms such as first, second, A, B, (a), and (b) may be used. Such terms are intended only to distinguish one constituting element from the others and do not limit the nature, sequence, or order of the constituting element. Also, unless defined otherwise, all the terms used in the present disclosure, including technical or scientific terms, provide the same meaning as understood generally by those skilled in the art to which the present disclosure belongs. Those terms defined in ordinary dictionaries should be interpreted to have the same meaning as conveyed in the context of related technology. Unless otherwise defined explicitly in the present disclosure, those terms should not be interpreted to have ideal or excessively formal meaning.

The expression "A or B" as used in the present disclosure may mean "only A", "only B", or "both A and B". In other words, "A or B" may be interpreted as "A and/or B" in the present disclosure. For example, in the present disclosure, "A, B, or C" may mean "only A", "only B", "only C", or "any combination of A, B and C".

A slash (/) or a comma used in the present disclosure may mean "and/or". For example, "A/B" may mean "A and/or B". Accordingly, "A/B" may mean "only A", "only B", or "both A and B". For example, "A, B, C" may mean "A, B, or C".

The phrase "at least one of A and B" as used in the present disclosure may mean "only A", "only B", or "both A and B". Also, the expression "at least one of A or B" or "at least one of A and/or B" may be interpreted to be the same as "at least one of A and B".

Also, the phrase "at least one of A, B and C" as used in the present disclosure may mean "only A", "only B", or "any combination of A, B and C". Also, the phrase "at least one of A, B, or C" or "at least one of A, B, and/or C" may mean "at least one of A, B, and C".

Figure 1:
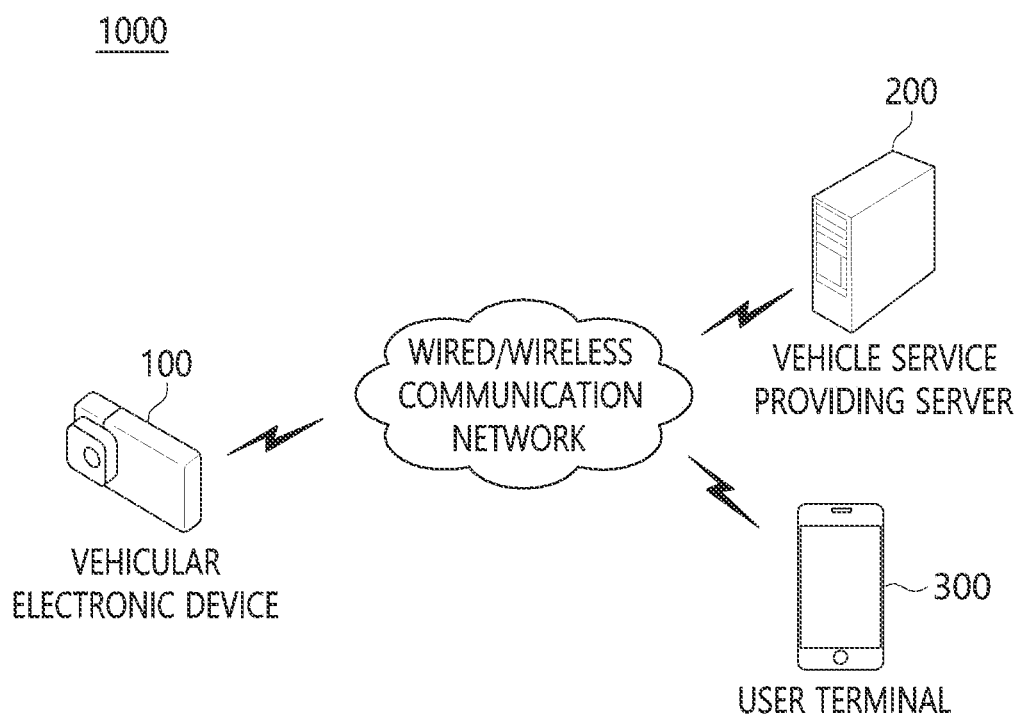
FIG. 1 is a block diagram illustrating a vehicle service system according to an embodiment of the present disclosure.

FIG. 1 is a block diagram illustrating a vehicle service system according to one embodiment.

In the present disclosure, a vehicle is an example of a moving body, which is not necessarily limited to the context of a vehicle. A moving body according to the present disclosure may include various mobile objects such as vehicles, people, bicycles, ships, and trains. In what follows, for the convenience of descriptions, it will be assumed that a moving body is a vehicle.

Also, in the present disclosure, a vehicular electronic device may be called other names, such as an infrared camera for a vehicle, a black box for a vehicle, a car dash cam, or a car video recorder.

Also, in the present disclosure, a vehicle service system may include at least one vehicle-related service system among a car dash cam service system, an advanced driver assistance system (ADAS), a traffic control system, an autonomous driving vehicle service system, a teleoperated vehicle driving system, an AI-based vehicle control system, and a V2X service system.

Referring to FIG. 1, a vehicle service system 1000 includes a vehicular electronic device 100, a vehicle service providing server 200, and a user terminal 300. The vehicle service providing server 200 may access a wired/wireless communication network wirelessly and exchange data with the vehicle service providing server 200 and the user terminal 300 connected to the wired/wireless communication network.

The vehicular electronic device 100 may be controlled by user control applied through the user terminal 300. For example, when a user selects an executable object installed in the user terminal 300, the vehicular electronic device 100 may perform operations corresponding to an event generated by the user input for the executable object. The executable object may be an application installed in the user terminal 300, capable of remotely controlling the vehicular electronic device 100.

Figure 2:
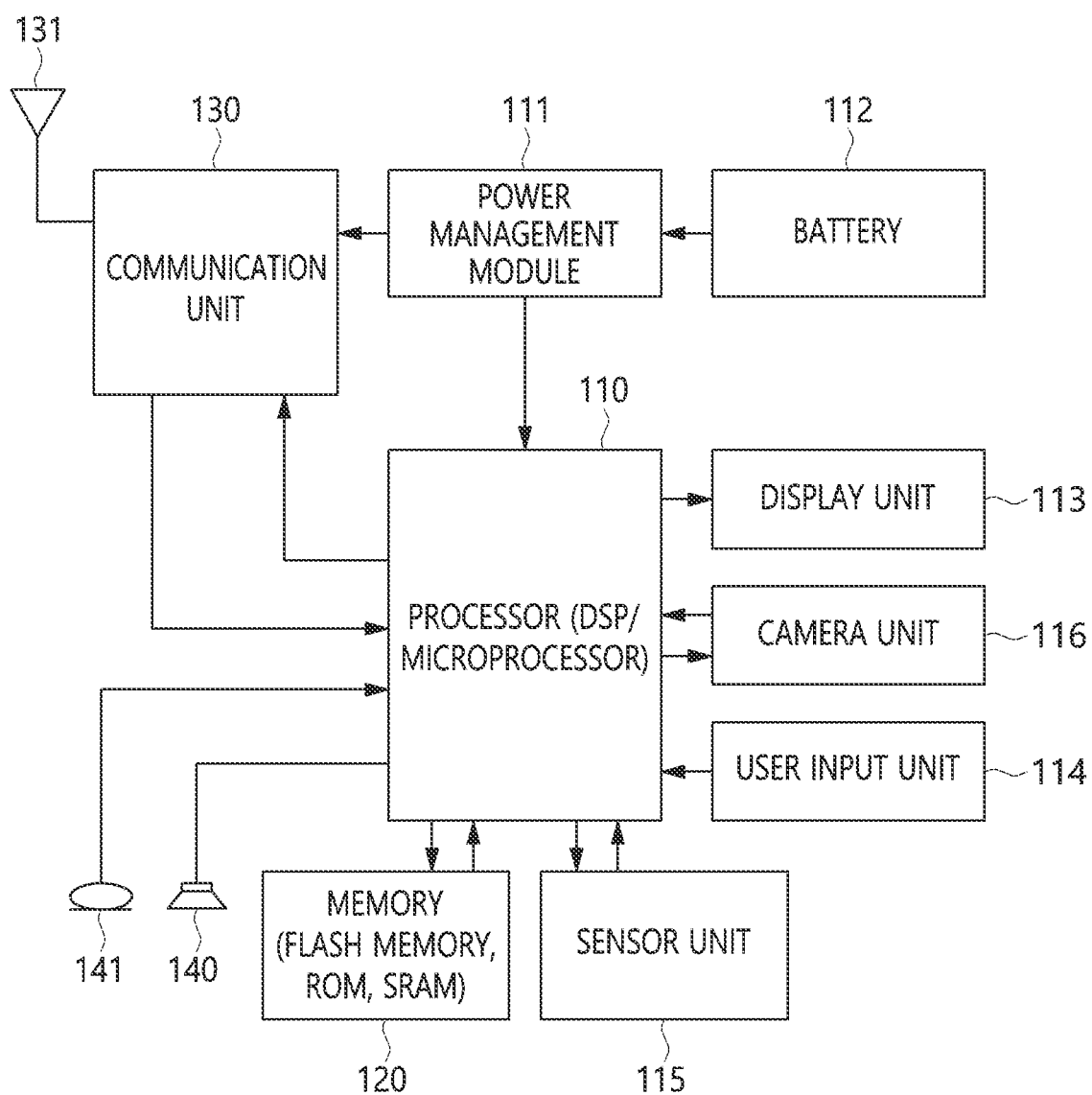
FIG. 2 is a block diagram illustrating a vehicular electronic device according to an embodiment of the present disclosure.

FIG. 2 is a block diagram illustrating a vehicular electronic device according to one embodiment.

Referring to FIG. 2, the vehicular electronic device 100 includes at least a portion of a processor 110, a power management module 111, a battery 112, a display unit 113, a user input unit 114, a sensor unit 115, a camera unit 116, a memory 120, a communication unit 130, one or more antennas 131, a speaker 140, and a microphone 141.

The processor 110 controls the overall operation of the vehicular electronic device 100 and may be configured to implement the proposed function, procedure, and/or method described in the present disclosure. The processor 110 may include an application-specific integrated circuit (ASIC), other chipsets, logic circuits, and/or data processing devices. The processor may be an application processor (AP). The processor 110 may include at least one of a digital signal processor (DSP), a central processing unit (CPU), a graphics processing unit (GPU), and a modulator and demodulator (Modem).

The processor 110 may control all or part of the power management module 111, the battery 112, the display unit 113, the user input unit 114, the sensor unit 115, the camera unit 116, the memory 120, the communication unit 130, one or more antennas 131, the speaker 140, and the microphone 141. In particular, when various data are received through the communication unit 130, the processor 110 may process the received data to generate a user interface and control the display unit 113 to display the generated user interface. The whole or part of the processor 110 may be electrically or operably coupled with or connected to other constituting elements within the vehicular electronic device 100 (e.g., the power management module 111, the battery 112, the display unit 113, the user input unit 114, the sensor unit 115, the camera unit 116, the memory 120, the communication unit 130, one or more antennas 131, the speaker 140, and the microphone 141).

The processor 110 may perform a signal processing function for processing image data acquired by the camera unit 116 and an image analysis function for obtaining on-site information from the image data. For example, the signal processing function includes a function of compressing the image data taken from the camera unit 116 to reduce the size of the image data. Image data are a collection of multiple frames sequentially arranged along the time axis. In other words, the image data may be regarded as a set of photographs consecutively taken during a given time period. Since image data size is huge when the image data are not compressed, and significant inefficiency is caused when the image data are stored in the memory without compression, compression is performed on the digitally converted image. For video compression, a method using correlation between frames, spatial correlation, and visual characteristics sensitive to low-frequency components is used. Since a portion of the original data is lost from compression, the image data may be compressed at an appropriate ratio, as low as to yield sufficient identification of the traffic accident involving a vehicle. As a video compression method, one of the various video codecs, such as the H.264, MPEG4, H.263, and H.265/HEVC, may be used, and image data is compressed in a manner supported by the vehicular electronic device 100.

The image analysis function may be based on deep learning and implemented by computer vision techniques. Specifically, the image analysis function may include an image segmentation function, which partitions an image into multiple areas or slices and inspects them separately; an object detection function, which identifies specific objects in the image; an advanced object detection model that recognizes multiple objects (e.g., a soccer field, a striker, a defender, or a soccer ball) present in one image (where the model uses XY coordinates to generate bounding boxes and identify everything therein); a facial recognition function, which not only recognizes human faces in the image but also identifies individuals; a boundary detection function, which identifies outer boundaries of objects or a scene to more accurately understand the content of the image, a pattern detection function, which recognizes repeated shapes, colors, or other visual indicators in the images; and a feature matching function, which compares similarities of images and classifies the images accordingly.

The image analysis function may be performed by the vehicle service providing server 200, not by the processor 110 of the vehicular electronic device 100.

The power management module 111 manages power for the processor 110 and/or the communication unit 130. The battery 112 provides power to the power management module 111.

The display unit 113 outputs results processed by the processor 110.

The display unit 113 may output content, data, or signals. In various embodiments, the display unit 113 may display an image signal processed by the processor 110. For example, the display unit 113 may display a capture or still image. In another example, the display unit 113 may display a video or a camera preview image. In yet another example, the display unit 113 may display a graphical user interface (GUI) to interact with the vehicular electronic device 100. The display unit 113 may include at least one of a liquid crystal display (LCD), a thin film transistor-liquid crystal display, an organic light-emitting diode (OLED), a flexible display, and a 3D display. The display unit 113 may be configured as an integrated touch screen by being coupled with a sensor capable of receiving a touch input.

The user input unit 114 receives an input to be used by the processor 110. The user input unit 114 may be displayed on the display unit 113. The user input unit 114 may sense a touch or hovering input of a finger or a pen. The user input unit 114 may detect an input caused by a rotatable structure or a physical button. The user input unit 114 may include sensors for detecting various types of inputs. The inputs received by the user input unit 114 may have various types. For example, the input received by the user input unit 114 may include touch and release, drag and drop, long touch, force touch, and physical depression. The input unit 430 may provide the received input and data related to the received input to the control unit 450. In various embodiments, the user input unit 114 may include a microphone or a transducer capable of receiving a user's voice command. In various embodiments, the user input unit 114 may include an image sensor or a camera capable of capturing a user's motion.

The sensor unit 115 includes one or more sensors. The sensor unit 115 has the function of detecting an impact applied to the vehicle or detecting a case where the amount of acceleration change exceeds a certain level. In some embodiments, the sensor unit 115 may be image sensors such as high dynamic range cameras. In some embodiments, the sensor unit 115 includes non-visual sensors. In some embodiments, the sensor unit 115 may include a radar sensor, a light detection and ranging (LiDAR) sensor, and/or an ultrasonic sensor in addition to an image sensor. In some embodiments, the sensor unit 115 may include an acceleration sensor or a geomagnetic field sensor to detect impact or acceleration.

In various embodiments, the sensor unit 115 may be attached at different positions and/or attached to face one or more different directions. For example, the sensor unit 115 may be attached to the front, sides, rear, and/or roof of a vehicle to face the forward-facing, rear-facing, and side-facing directions.

The camera unit 116 may capture an image in at least one of the situations, including parking, stopping, and driving a vehicle. Here, the captured image may include a parking lot image that is a captured image of the parking lot. The parking lot image may include images captured from when a vehicle enters the parking lot to when the vehicle leaves the parking lot. In other words, the parking lot image may include images taken from when the vehicle enters the parking lot until when the vehicle is parked (e.g., the time the vehicle is turned off to park), the images taken while the vehicle is parked, and the images taken from when the vehicle gets out of the parked state (e.g., the vehicle is started on to leave the parking lot) to when the vehicle leaves the parking lot. The captured image may include at least one image of the front, rear, side, and interior of the vehicle. Also, the camera unit 116 may include an infrared camera capable of monitoring the driver's face or pupils.

The camera unit 116 may include a lens unit and an imaging device. The lens unit may perform the function of condensing an optical signal, and an optical signal transmitted through the lens unit reaches an imaging area of the imaging device to form an optical image. Here, the imaging device may use a Charge Coupled Device (CCD), a Complementary Metal Oxide Semiconductor Image Sensor (CIS), or a high-speed image sensor, which converts an optical signal into an electrical signal. Also, the camera unit 116 may further include all or part of a lens unit driver, an aperture, an aperture driving unit, an imaging device controller, and an image processor.

The operation mode of the vehicular electronic device 100 may include a continuous recording mode, an event recording mode, a manual recording mode, and a parking recording mode.

The continuous recording mode is executed when the vehicle is started up and remains operational while the vehicle continues to drive. In the continuous recording mode, the vehicle image capture device 100 may perform recording in predetermined time units (e.g., 1 to 5 minutes). In the present disclosure, the continuous recording mode and the continuous mode may be used in the same meaning.

The parking recording mode may refer to a mode operating in a parked state when the vehicle's engine is turned off, or the battery supply for vehicle driving is stopped. In the parking recording mode, the vehicular electronic device 100 may operate in the continuous parking recording mode in which continuous recording is performed while the vehicle is parked. Also, in the parking recording mode, the vehicular electronic device 100 may operate in a parking event recording mode in which recording is performed when an impact event is detected during parking. In this case, recording may be performed during a predetermined period ranging from a predetermined time before the occurrence of the event to a predetermined time after the occurrence of the event (e.g., recording from 10 seconds before to 10 seconds after the occurrence of the event). In the present disclosure, the parking recording mode and the parking mode may be used in the same meaning.

The event recording mode may refer to the mode operating at the occurrence of various events while the vehicle is driving.

The manual recording mode may refer to a mode in which a user manually operates recording. In the manual recording mode, the vehicular electronic device 100 may perform recording (e.g., recording of images 10 seconds before to 10 seconds after an event) from a predetermined time before the occurrence of the user's manual recording request to the time after the predetermined time.

The memory 120 is operatively coupled to the processor 110 and stores a variety of information for operating the processor 110. The memory 120 may include a read-only memory (ROM), a random-access memory (RAM), a flash memory, a memory card, a storage medium, and/or other equivalent storage devices. When the embodiment is implemented in software, the techniques explained in the present disclosure may be implemented with a module (i.e., procedure, function, etc.) for performing the functions explained in the present disclosure. The module may be stored in the memory 120 and may be performed by the processor 110. The memory 120 may be implemented inside the processor 110. Alternatively, the memory 120 may be implemented outside the processor 110 and may be coupled to the processor 110 in a communicable manner by using various well-known means.

The memory 120 may be integrated within the vehicular electronic device 100, installed in a detachable form through a port provided by the vehicular electronic device 100, or located externally to the vehicular electronic device 100. When the memory 120 is integrated within the vehicular electronic device 100, the memory 120 may take the form of a hard disk drive or a flash memory. When the memory 120 is installed in a detachable form in the vehicular electronic device 100, the memory 120 may take the form of an SD card, a Micro SD card, or a USB memory. When the memory 120 is located externally to the vehicular electronic device 100, the memory 120 may exist in a storage space of another device or a database server through the communication unit 130.

The communication unit 130 is coupled operatively to the processor 110 and transmits and/or receives a radio signal. The communication unit 130 includes a transmitter and a receiver. The communication unit 130 may include a baseband circuit for processing a radio frequency signal. The communication unit 130 controls one or more antennas 131 to transmit and/or receive a radio signal. The communication unit 130 enables the vehicular electronic device 100 to communicate with other devices. Here, the communication unit 130 may be provided as a combination of at least one of various well-known communication modules, such as a cellular mobile communication module, a short-distance wireless communication module such as a wireless local area network (LAN) method, or a communication module using the low-power wide-area (LPWA) technique. Also, the communication unit 130 may perform a location-tracking function, such as the Global Positioning System (GPS) tracker.

The speaker 140 outputs a sound-related result processed by the processor 110. For example, the speaker 140 may output audio data indicating that a parking event has occurred. The microphone 141 receives sound-related input to be used by processor 110. The received sound, which is a sound caused by an external impact or a person's voice related to a situation inside/outside the vehicle, may help to recognize the situation at that time along with images captured by the camera unit 116. The sound received through the microphone 141 may be stored in the memory 120.

Figure 3:
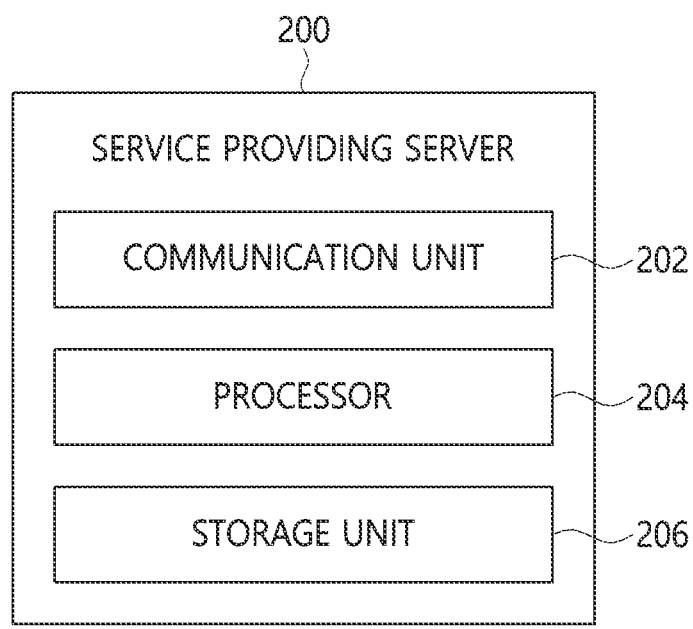
FIG. 3 is a block diagram illustrating a vehicle service providing server according to an embodiment of the present disclosure.

FIG. 3 is a block diagram illustrating a vehicle service providing server according to one embodiment.

Referring to FIG. 3, the vehicle service providing server 200 includes a communication unit 202, a processor 204, and a storage unit 206. The communication unit 202 of the vehicle service providing server 200 transmits and receives data to and from the vehicular electronic device 100 and/or the user terminal 300 through a wired/wireless communication network.

Figure 4:
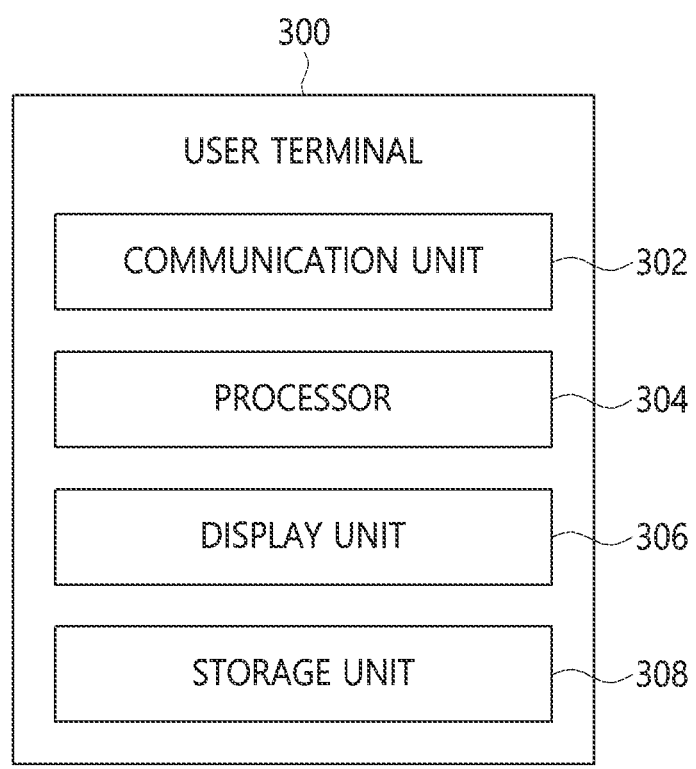
FIG. 4 is a block diagram illustrating a user terminal device according to an embodiment of the present disclosure.

FIG. 4 is a block diagram of a user terminal according to one embodiment.

Referring to FIG. 4, the user terminal 300 includes a communication unit 302, a processor 304, a display unit 306, and a storage unit 308. The communication unit 302 transmits and receives data to and from the vehicular electronic device 100 and/or the vehicle service providing server 200 through a wired/wireless communication network. The processor 304 controls the overall function of the user terminal 300 and transmits a command input by the user to the vehicle service system 1000 through the communication unit 302 according to an embodiment of the present disclosure. When a control message related to a vehicle service is received from the vehicle service providing server 200, the processor 304 controls the display unit 306 to display the control message to the user.

Figure 5:
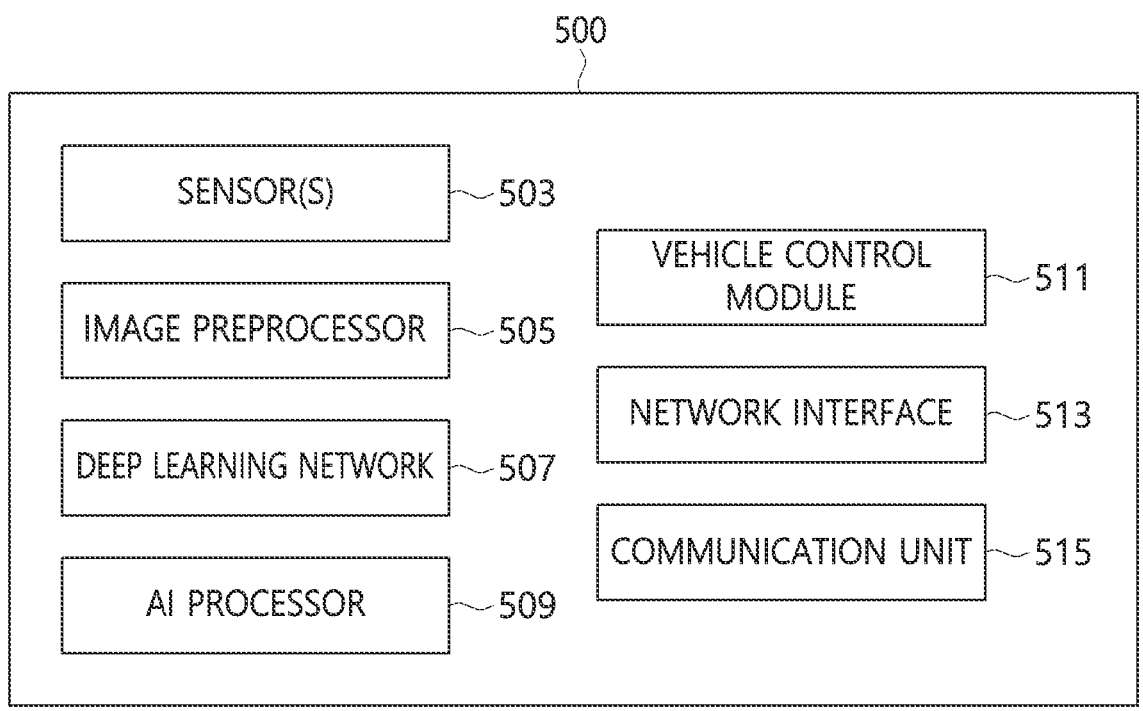
FIG. 5 is a block diagram illustrating an autonomous driving system 500 for a vehicle.

FIG. 5 is a block diagram illustrating an autonomous driving system 500 of a vehicle.

The autonomous driving system 500 of a vehicle according to FIG. 5 may be a deep learning network including sensors 503, an image preprocessor 505, a deep learning network 507, an artificial intelligence (AI) processor 509, a vehicle control module 511, a network interface 513, and a communication unit 515. In various embodiments, each constituting element may be connected through various interfaces. For example, sensor data sensed and output by the sensors 503 may be fed to the image preprocessor 505. The sensor data processed by the image preprocessor 505 may be fed to the deep learning network 507 that runs on the AI processor 509. The output of the deep learning network 507 run by the AI processor 509 may be fed to the vehicle control module 511. Intermediate results of the deep learning network 507 running on the AI processor 507 may be fed to the AI processor 509. In various embodiments, the network interface 513 transmits autonomous driving path information and/or autonomous driving control commands for the autonomous driving of the vehicle to internal block components by communicating with an electronic device in the vehicle. In one embodiment, the network interface 531 may be used to transmit sensor data obtained through sensor(s) 503 to an external server. In some embodiments, the autonomous driving control system 500 may include additional or fewer constituting elements, as deemed appropriate. For example, in some embodiments, the image preprocessor 505 may be an optional component. For another example, a post-processing component (not shown) may be included within the autonomous driving control system 500 to perform post-processing on the output of the deep learning network 507 before the output is provided to the vehicle control module 511.

In some embodiments, the sensors 503 may include one or more sensors. In various embodiments, the sensors 503 may be attached to different locations on the vehicle. The sensors 503 may face one or more different directions. For example, the sensors 503 may be attached to the front, sides, rear, and/or roof of a vehicle to face the forward-facing, rear-facing, and side-facing directions. In some embodiments, the sensors 503 may be image sensors such as high dynamic range cameras. In some embodiments, the sensors 503 include non-visual sensors. In some embodiments, the sensors 503 include a radar sensor, a light detection and ranging (LiDAR) sensor, and/or ultrasonic sensors in addition to the image sensor. In some embodiments, the sensors 503 are not mounted on a vehicle with the vehicle control module 511. For example, the sensors 503 may be included as part of a deep learning system for capturing sensor data, attached to the environment or road, and/or mounted to surrounding vehicles.

In some embodiments, the image preprocessor 505 may be used to preprocess sensor data of the sensors 503. For example, the image preprocessor 505 may be used to preprocess sensor data, split sensor data into one or more components, and/or postprocess one or more components. In some embodiments, the image preprocessor 505 may be a graphics processing unit (GPU), a central processing unit (CPU), an image signal processor, or a specialized image processor. In various embodiments, image preprocessor 505 may be a tone-mapper processor for processing high dynamic range data. In some embodiments, image preprocessor 505 may be a constituting element of AI processor 509.

In some embodiments, the deep learning network 507 may be a deep learning network for implementing control commands for controlling an autonomous vehicle. For example, the deep learning network 507 may be an artificial neural network such as a convolutional neural network (CNN) trained using sensor data, and the output of the deep learning network 507 is provided to the vehicle control module 511.

In some embodiments, the artificial intelligence (AI) processor 509 may be a hardware processor for running the deep learning network 507. In some embodiments, the AI processor 509 is a specialized AI processor for performing inference through a convolutional neural network (CNN) on sensor data. In some embodiments, the AI processor 509 may be optimized for bit depth of sensor data. In some embodiments, AI processor 509 may be optimized for deep learning computations, such as those of a neural network including convolution, inner product, vector and/or matrix operations. In some embodiments, the AI processor 509 may be implemented through a plurality of graphics processing units (GPUs) capable of effectively performing parallel processing.

In various embodiments, the AI processor 509 may be coupled through an input/output interface to a memory configured to provide the AI processor with instructions to perform deep learning analysis on the sensor data received from the sensor(s) 503 while the AI processor 509 is running and to determine machine learning results used to make the vehicle operate with at least a portionial autonomy. In some embodiments, the vehicle control module 511 may be used to process commands for vehicle control output from the artificial intelligence (AI) processor 509 and translate the output of the AI processor 509 into commands for controlling each vehicle module to control various vehicle modules. In some embodiments, the vehicle control module 511 is used to control a vehicle for autonomous driving. In some embodiments, the vehicle control module 511 may adjust the steering and/or speed of the vehicle. For example, the vehicle control module 511 may be used to control the driving of the vehicle, such as deceleration, acceleration, steering, lane change, and lane-keeping function. In some embodiments, the vehicle control module 511 may generate control signals to control vehicle lighting, such as brake lights, turn signals, and headlights. In some embodiments, the vehicle control module 511 may be used to control vehicle audio-related systems, such as the vehicle's sound system, audio warnings, microphone system, and horn system.

In some embodiments, the vehicle control module 511 may be used to control notification systems that include warning systems to alert passengers and/or drivers of driving events, such as approaching an intended destination or potential collision. In some embodiments, the vehicle control module 511 may be used to calibrate sensors, such as the sensors 503 of the vehicle. For example, the vehicle control module 511 may modify the orientation of the sensors 503, change the output resolution and/or format type of the sensors 503, increase or decrease the capture rate, adjust the dynamic range, and adjust the focus of the camera. Also, the vehicle control module 511 may individually or collectively turn on or off the operation of the sensors.

In some embodiments, the vehicle control module 511 may be used to change the parameters of the image preprocessor 505, such as modifying the frequency range of filters, adjusting edge detection parameters for feature and/or object detection, and adjusting channels and bit depth. In various embodiments, the vehicle control module 511 may be used to control the autonomous driving and/or driver assistance functions of the vehicle.

In some embodiments, the network interface 513 may serve as an internal interface between block components of the autonomous driving control system 500 and the communication unit 515. Specifically, the network interface 513 may be a communication interface for receiving and/or sending data that includes voice data. In various embodiments, the network interface 513 may be connected to external servers to connect voice calls through the communication unit 515, receive and/or send text messages, transmit sensor data, update the software of the vehicle into the autonomous driving system, or update the software of the autonomous driving system of the vehicle.

In various embodiments, the communication unit 515 may include various cellular or WiFi-type wireless interfaces. For example, the network interface 513 may be used to receive updates on operating parameters and/or instructions for the sensors 503, image preprocessor 505, deep learning network 507, AI processor 509, and vehicle control module 511 from an external server connected through the communication unit 515. For example, a machine learning model of the deep learning network 507 may be updated using the communication unit 515. According to another example, the communication unit 515 may be used to update the operating parameters of the image preprocessor 505 such as image processing parameters and/or the firmware of the sensors 503.

In another embodiment, the communication unit 515 may be used to activate communication for emergency services and emergency contact in an accident or near-accident event. For example, in the event of a collision, the communication unit 515 may be used to call emergency services for assistance and may be used to inform emergency services of the collision details and the vehicle location. In various embodiments, the communication unit 515 may update or obtain an expected arrival time and/or the location of a destination.

According to one embodiment, the autonomous driving system 500 shown in FIG. 5 may be configured as a vehicular electronic device. According to one embodiment, when the user triggers an autonomous driving release event during autonomous driving of the vehicle, the AI processor 509 of the autonomous driving system 500 may train the autonomous driving software of the vehicle by controlling the information related to the autonomous driving release event to be input as the training set data of a deep learning network.

Figure 6:
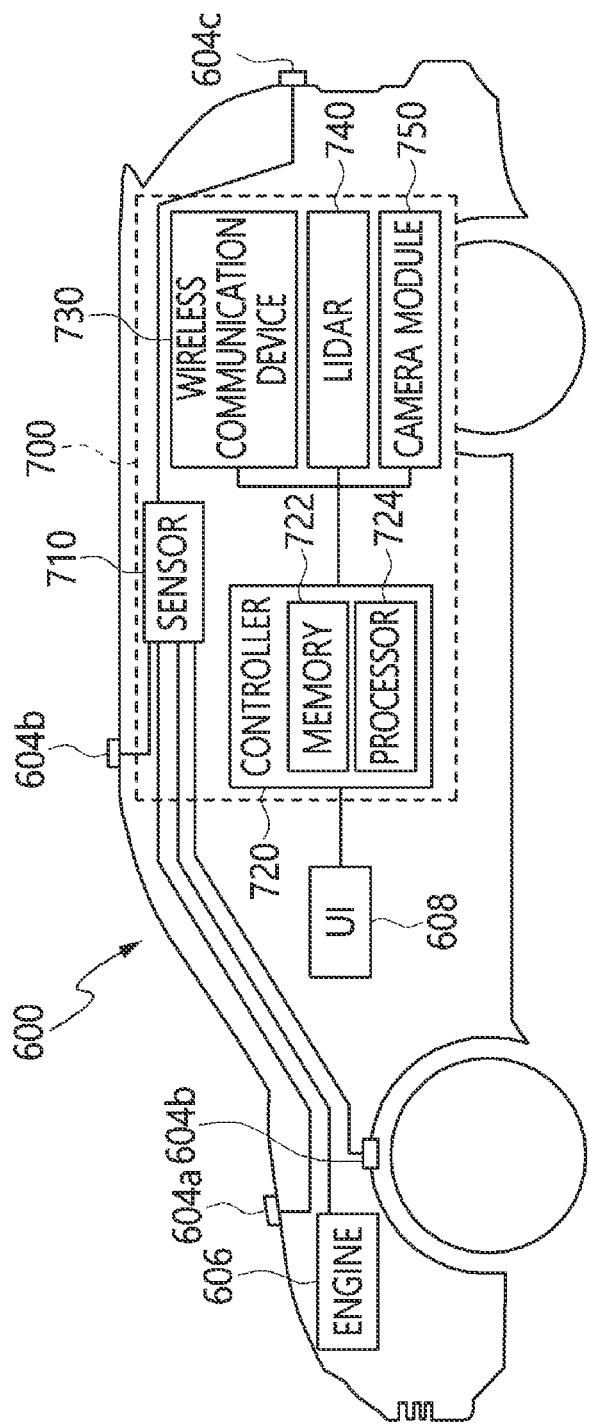
FIG. 6 is a block diagram illustrating an autonomous vehicle according to an embodiment of the present disclosure.
Figure 7:
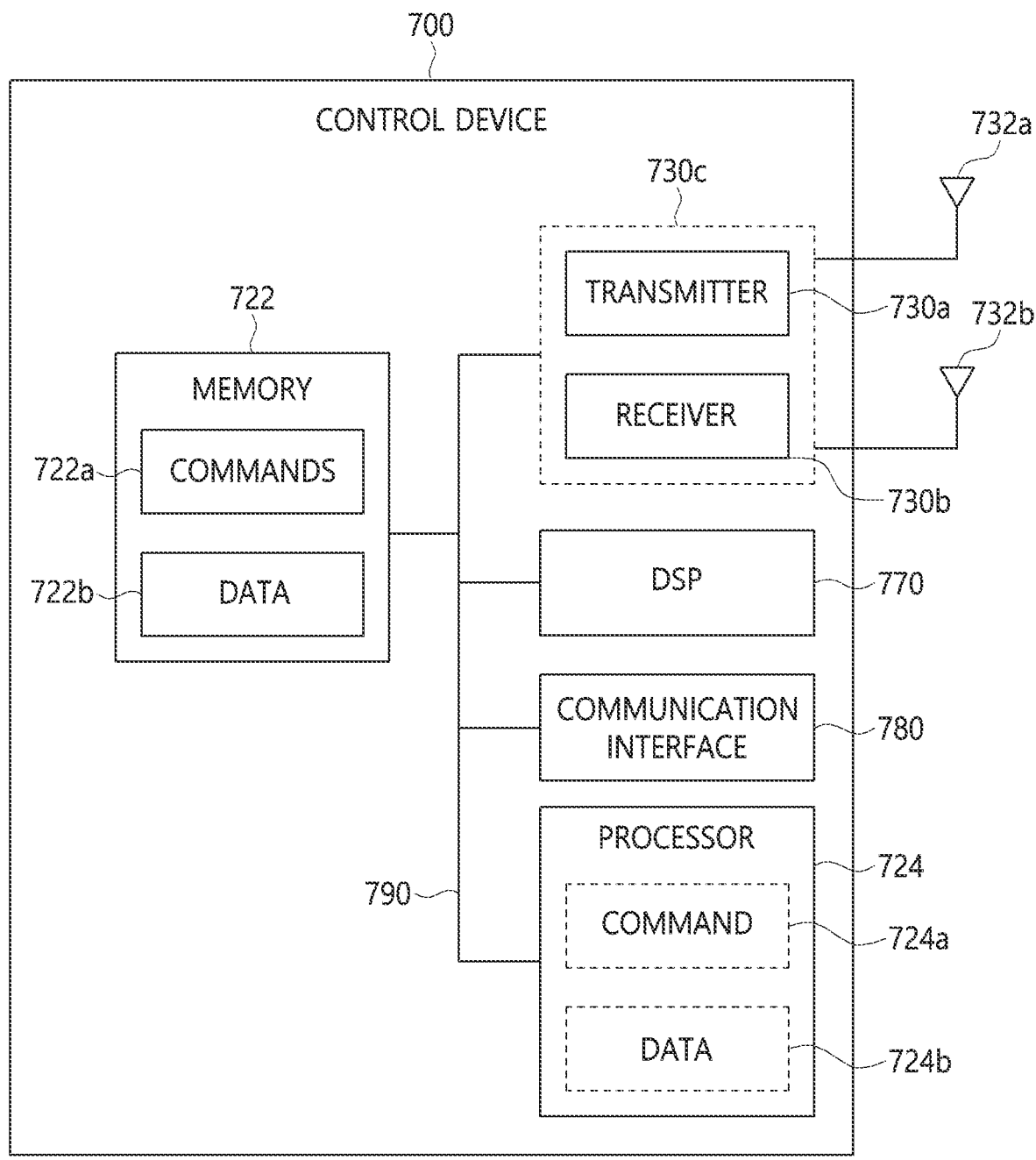
FIG. 7 is a block diagram showing a control device for an autonomous vehicle according to an embodiment of the present disclosure.

FIGS. 6 and 7 are one example of a block diagram illustrating an autonomous driving moving body according to one embodiment. Referring to FIG. 6, the autonomous driving moving body 600 according to the present embodiment may include a control device 700, sensing modules 604a, 604b, 604c, 604d, an engine 606, and a user interface 608.

The autonomous driving moving body 600 may have an autonomous driving mode or a manual mode. For example, the manual mode may be switched to the autonomous driving mode, or the autonomous driving mode may be switched to the manual mode according to the user input received through the user interface 608.

When the autonomous driving moving body 600 is operated in the autonomous driving mode, the autonomous driving moving body 600 may be operated under the control of the control device 700.

In the present embodiment, the control device 700 may include a controller 720 that includes a memory 722 and a processor 724, a sensor 710, a communication device 730, and an object detection device 740.

Here, the object detection device 740 may perform all or part of the functions of the distance measuring device (e.g., the electronic device 71).

In other words, in the present embodiment, the object detection device 740 is a device for detecting an object located outside the moving body 600, and the object detection device 740 may detect an object located outside the moving body 600 and generate object information according to the detection result.

The object information may include information on the presence or absence of an object, location information of the object, distance information between the moving body and the object, and relative speed information between the moving body and the object.

The objects may include various objects located outside the moving body 600, such as lanes, other vehicles, pedestrians, traffic signals, lights, roads, structures, speed bumps, terrain objects, and animals. Here, the traffic signal may include a traffic light, a traffic sign, and a pattern or text drawn on a road surface. Also, the light may be light generated from a lamp installed in another vehicle, light generated from a street lamp, or sunlight.

Also, the structures may be an object located near the road and fixed to the ground. For example, the structures may include street lights, street trees, buildings, telephone poles, traffic lights, and bridges. The terrain objects may include a mountain, a hill, and the like.

The object detection device 740 may include a camera module. The controller 720 may extract object information from an external image captured by the camera module and process the extracted information.

Also, the object detection device 740 may further include imaging devices for recognizing an external environment. In addition to the LiDAR sensors, radar sensors, GPS devices, odometry and other computer vision devices, ultrasonic sensors, and infrared sensors may be used, and these devices may be selected as needed or operated simultaneously to enable more precise sensing.

Meanwhile, the distance measuring device according to one embodiment of the present disclosure may calculate the distance between the autonomous driving moving body 600 and an object and control the operation of the moving body based on the calculated distance in conjunction with the control device 700 of the autonomous driving moving body 600.

As an example, suppose a collision may occur depending on the distance between the autonomous driving moving body 600 and an object. In that case, the autonomous driving moving body 600 may control the brake to slow down or stop. As another example, if the object is a moving object, the autonomous driving moving body 600 may control the driving speed of the autonomous driving moving body 600 to keep a distance larger than a predetermined threshold from the object.

The distance measuring device according to one embodiment of the present disclosure may be configured as one module within the control device 700 of the autonomous driving moving body 600. In other words, the memory 722 and the processor 724 of the control device 700 may implement a collision avoidance method according to the present disclosure in software.

Also, the sensor 710 may obtain various types of sensing information from the internal/external environment of the moving body by being connected to the sensing modules 604a, 604b, 604c, and 604d. Here, the sensor 710 may include a posture sensor (e.g., a yaw sensor, a roll sensor, or a pitch sensor), a collision sensor, a wheel sensor, a speed sensor, an inclination sensor, a weight sensor, a heading sensor, a gyro sensor, a position module, a sensor measuring the forward/backward movement of the moving body, a battery sensor, a fuel sensor, a tire sensor, a steering sensor measuring the rotation of the steering wheel, a sensor measuring the internal temperature of the moving body, and a sensor measuring the internal humidity of the moving body, an ultrasonic sensor, an illumination sensor, an accelerator pedal position sensor, and a brake pedal position sensor.

Accordingly, the sensor 710 may obtain sensing signals related to moving body attitude information, moving body collision information, moving body direction information, moving body position information (GPS information), moving body orientation information, moving body speed information, moving body acceleration information, moving body tilt information, moving body forward/backward movement information, battery information, fuel information, tire information, moving body lamp information, moving body internal temperature information, moving body internal humidity information, steering wheel rotation angle, external illuminance of the moving body, pressure applied to the accelerator pedal, and pressure applied to the brake pedal.

Also, the sensor 710 may further include an accelerator pedal sensor, a pressure sensor, an engine speed sensor, an air flow sensor (AFS), an intake air temperature sensor (ATS), a water temperature sensor (WTS), a throttle position sensor (TPS), a TDC sensor, and a crank angle sensor (CAS).

As described above, the sensor 710 may generate moving object state information based on the sensing data.

The wireless communication device 730 is configured to implement wireless communication between autonomous driving moving bodies 600. For example, the wireless communication device 730 enables the autonomous driving moving body 600 to communicate with a user's mobile phone, another wireless communication device 730, another moving body, a central device (traffic control device), or a server. The wireless communication device 730 may transmit and receive wireless signals according to a wireless communication protocol. The wireless communication protocol may be Wi-Fi, Bluetooth, Long-Term Evolution (LTE), Code Division Multiple Access (CDMA), Wideband Code Division Multiple Access (WCDMA), or Global Systems for Mobile Communications (GSM); however, the communication protocol is not limited to the specific examples above.

Also, the autonomous driving moving body 600 according to the present embodiment may implement communication between mobile bodies through the wireless communication device 730. In other words, the wireless communication device 730 may communicate with other moving bodies on the road through vehicle-to-vehicle communication. The autonomous driving moving body 600 may transmit and receive information such as a driving warning and traffic information through vehicle-to-vehicle communication and may also request information from another moving body or receive a request from another moving body. For example, the wireless communication device 730 may perform V2V communication using a dedicated short-range communication (DSRC) device or a Cellular-V2V (C-V2V) device. In addition to the V2V communication, communication between a vehicle and other objects (e.g., electronic devices carried by pedestrians) (Vehicle to Everything (V2X) communication) may also be implemented through the wireless communication device 730.

In the present embodiment, the controller 720 is a unit that controls the overall operation of each unit within the moving body 600, which may be configured by the manufacturer of the moving body at the time of manufacturing or additionally configured to perform the function of autonomous driving after manufacturing. Alternatively, the controller may include a configuration for the continuing execution of additional functions through an upgrade of the controller 720 configured at the time of manufacturing. The controller 720 may be referred to as an Electronic Control Unit (ECU).

The controller 720 may collect various data from the connected sensor 710, the object detection device 740, the communication device 730, and so on and transmit a control signal to the sensor 710, the engine 606, the user interface 608, the communication device 730, and the object detection device 740 including other configurations within the moving body. Also, although not shown in the figure, the control signal may be transmitted to an accelerator, a braking system, a steering device, or a navigation device related to the driving of the moving body.

In the present embodiment, the controller 720 may control the engine 606; for example, the controller 720 may detect the speed limit of the road on which the autonomous driving moving body 600 is driving and control the engine to prevent the driving speed from exceeding the speed limit or control the engine 606 to accelerate the driving speed of the autonomous driving moving body 600 within a range not exceeding the speed limit.

Also, if the autonomous driving moving body 600 is approaching or departing from the lane while the autonomous driving moving body 600 is driving, the controller 720 may determine whether the approaching or departing from the lane is due to a normal driving situation or other unexpected driving situations and control the engine 606 to control the driving of the moving body according to the determination result. Specifically, the autonomous driving moving body 600 may detect lanes formed on both sides of the road in which the moving body is driving. In this case, the controller 720 may determine whether the autonomous driving moving body 600 is approaching or leaving the lane; if it is determined that the autonomous driving moving body 600 is approaching or departing from the lane, the controller 720 may determine whether the driving is due to a normal driving situation or other driving situations. Here, as an example of a normal driving situation, the moving body may need to change lanes. Similarly, as an example of other driving situations, the moving body may not need a lane change. If the controller 720 determines that the autonomous driving moving body 600 is approaching or departing from the lane in a situation where a lane change is not required for the moving body, the controller 720 may control the driving of the autonomous driving moving body 600 so that the autonomous driving moving body 600 does not leave the lane and keeps normal driving.

When encountering another moving body or an obstacle in front of the moving body, the controller 720 may control the engine 606 or the braking system to decelerate the autonomous driving moving body and control the trajectory, driving path, and steering angle in addition to speed. Alternatively, the controller 720 may control the driving of the moving body by generating necessary control signals according to the recognition information of other external environments, such as driving lanes and driving signals of the moving body.

In addition to generating a control signal for the moving body, the controller 720 may also control the driving of the moving body by communicating with surrounding moving bodies or a central server and transmitting commands to control the peripheral devices through the received information.

Also, when the position of the camera module 750 is changed, or the angle of view is changed, it may be difficult for the controller 720 to accurately recognize a moving object or a lane according to the present embodiment; to address the issue above, the controller 750 may generate a control signal, which controls the camera module 750 to perform calibration. Therefore, since the controller 720 according to the present embodiment generates a control signal for the calibration of the camera module 750, the normal mounting position, orientation, and angle of view of the camera module 750 may be kept continuously even if the mounting position of the camera module 750 is changed due to vibration or shock generated by the motion of the autonomous driving moving body 600. The controller 720 may generate a control signal to perform calibration of the camera module 750 when the initial mounting position, orientation, and angle of view information of the camera module 750 stored in advance deviate from the initial mounting position, orientation, and angle of view information of the camera module 750 measured while the autonomous driving moving body 600 is driving by more than a threshold value.

In the present embodiment, the controller 720 may include the memory 722 and the processor 724. The processor 724 may execute the software stored in the memory 722 according to the control signal of the controller 720. Specifically, the controller 720 may store data and commands for performing a lane detection method according to the present disclosure in the memory 722, and the commands may be executed by the processor 724 to implement one or more methods of the present disclosure.

At this time, the memory 722 may be implemented by a non-volatile recording medium executable by the processor 724. The memory 722 may store software and data through an appropriate internal or external device. The memory 722 may be configured to include a random-access memory (RAM), a read only memory (ROM), a hard disk, and a memory 722 device coupled with a dongle.

The memory 722 may store at least an operating system (OS), a user application, and executable commands. The memory 722 may also store application data and array data structures.

The processor 724 may be a microprocessor or an appropriate electronic processor, which may be a controller, a microcontroller, or a state machine.

The processor 724 may be implemented as a combination of computing devices, and the computing device may be a digital signal processor, a microprocessor, or an appropriate combination thereof.

Meanwhile, the autonomous driving moving body 600 may further include a user interface 608 for receiving a user's input to the control device 700 described above. The user interface 608 may allow the user to enter information through an appropriate interaction. For example, the user interface 608 may be implemented as a touch screen, a keypad, or a set of operation buttons. The user interface 608 may transmit an input or a command to the controller 720, and the controller 720 may perform a control operation of the moving object in response to the input or command.

Also, the user interface 608 may allow a device external to the autonomous driving moving body 600 to communicate with the autonomous driving moving body 600 through the wireless communication device 730. For example, the user interface 608 may be compatible with a mobile phone, a tablet, or other computing devices.

Furthermore, although the present embodiment assumes that the autonomous driving moving body 600 is configured to include the engine 606, it is also possible to include other types of propulsion systems. For example, the moving body may be operated by electric energy, hydrogen energy, or a hybrid system combining them. Therefore, the controller 720 may include a propulsion mechanism according to the propulsion system of the autonomous driving moving body 600 and provide a control signal according to the propulsion mechanism to the components of each propulsion mechanism.

In what follows, a specific structure of the control device 700 according to an embodiment of the present disclosure will be described in more detail with reference to FIG. 7.

The control device 700 includes a processor 724. The processor 724 may be a general-purpose single or multi-chip microprocessor, a dedicated microprocessor, a micro-controller, or a programmable gate array. The processor may be referred to as a central processing unit (CPU). Also, the processor 724 according to the present disclosure may be implemented by a combination of a plurality of processors.

The control device 700 also includes a memory 722. The memory 722 may be an arbitrary electronic component capable of storing electronic information. The memory 722 may also include a combination of memories 722 in addition to a single memory.

The memory 722 may store data and commands 722a for performing a distance measuring method by a distance measuring device according to the present disclosure. When the processor 724 performs the commands 722a, the commands 722a and the whole or part of the data 722b needed to perform the commands may be loaded into the processor 724.

The control device 700 may include a transmitter 730a, a receiver 730b, or a transceiver 730c for allowing transmission and reception of signals. One or more antennas 732a, 732b may be electrically connected to the transmitter 730a, receiver 730b, or each transceiver 730c and may additionally include antennas.

The control device 700 may include a digital signal processor (DSP) 770. Through the DSP 770, the moving body may quickly process digital signals.

The control device 700 may include a communication interface 780. The communication interface 780 may include one or more ports and/or communication modules for connecting other devices to the control device 700. The communication interface 780 may allow a user and the control device 700 to interact with each other.

Various components of the control device 700 may be connected together by one or more buses 790, and the buses 790 may include a power bus, a control signal bus, a status signal bus, a data bus, and the like. Under the control of the processor 724, components may transfer information to each other through the bus 790 and perform target functions.

Figure 8:
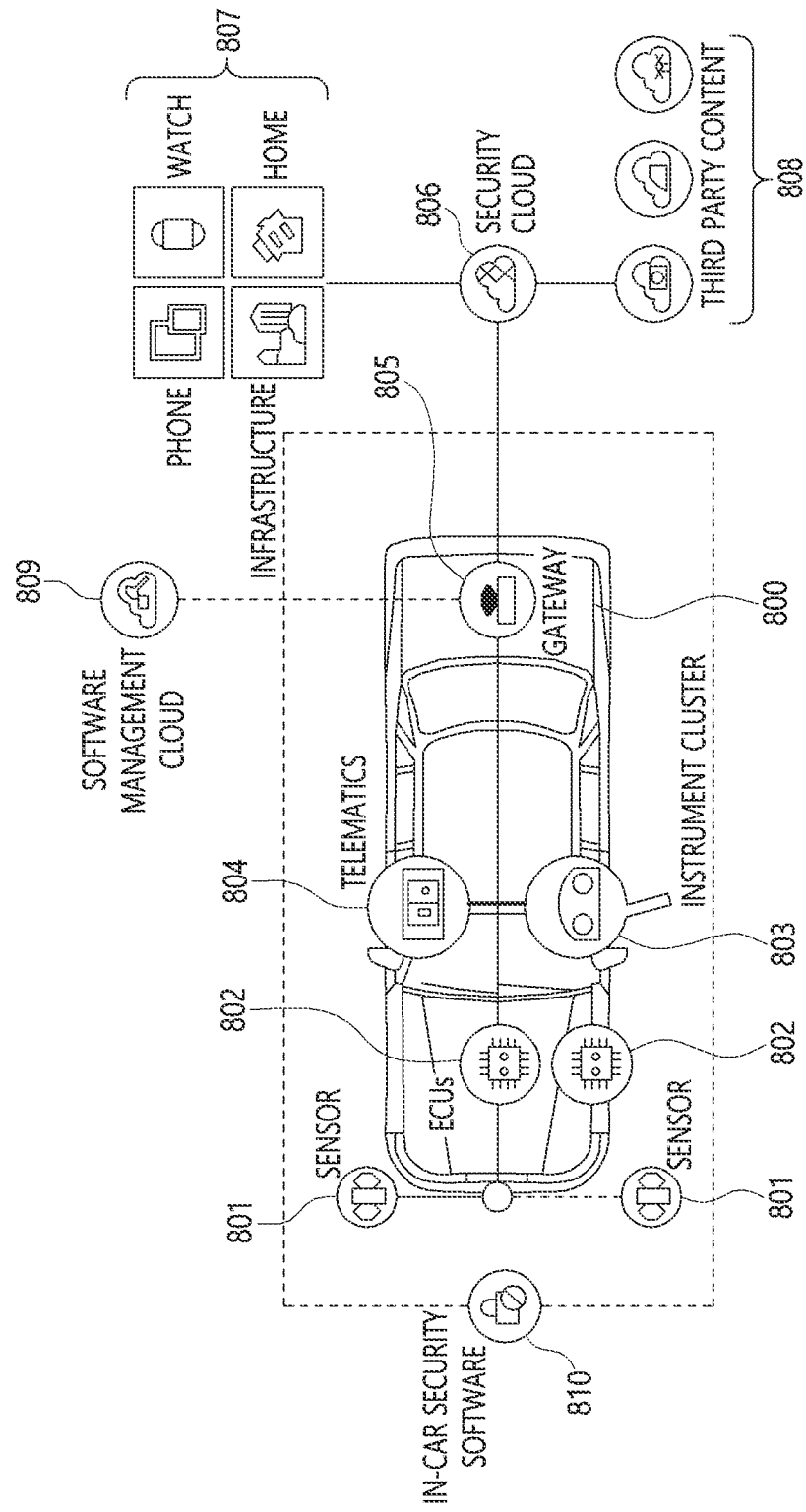
FIG. 8 is a block diagram illustrating an autonomous vehicle according to another embodiment of the present disclosure.

Meanwhile, in various embodiments, the control device 700 may be associated with a gateway for communication with a security cloud. For example, referring to FIG. 8, the control device 700 may be related to a gateway 805 for providing information obtained from at least one of the components 801 to 804 of the vehicle 800 to the security cloud 806. For example, the gateway 805 may be included in the control device 700. In another example, the gateway 805 may be configured as a separate device within the vehicle 800 distinguished from the control device 700. The gateway 805 communicatively connects the software management cloud 809 having different networks, the security cloud 806, and the network within the vehicle 800 secured by the in-vehicle security software 810.

For example, the constituting element 801 may be a sensor. For example, the sensor may be used to obtain information on at least one of the state of the vehicle 800 and the state of the surroundings of the vehicle 800. For example, the constituting element 801 may include the sensor 1410.

For example, the constituting element 802 may be electronic control units (ECUs). For example, the ECUs may be used for engine control, transmission control, airbag control, and management of tire air pressure management.

For example, the constituting element 803 may be an instrument cluster. For example, the instrument cluster may refer to a panel located in front of a driver's seat in the dashboard. For example, the instrument cluster may be configured to show information necessary for driving to the driver (or passengers). For example, the instrument cluster may be used to display at least one of the visual elements for indicating revolutions per minute or rotate per minute (RPM) of the engine, visual elements for indicating the speed of the vehicle 800, visual elements for indicating the remaining fuel amount, visual elements for indicating the state of the gear, or visual elements for indicating information obtained through the constituting element 801.

For example, the constituting element 804 may be a telematics device. For example, the telematics device may refer to a device that provides various mobile communication services such as location information and safe driving within the vehicle 800 by combining wireless communication technology and global positioning system (GPS) technology. For example, the telematics device may be used to connect the vehicle 800 with the driver, the cloud (e.g., the security cloud 806), and/or the surrounding environment.

For example, the telematics device may be configured to support high bandwidth and low latency to implement the 5G NR standard technology (e.g., V2X technology of 5G NR). For example, the telematics device may be configured to support autonomous driving of the vehicle 800.

For example, the gateway 805 may be used to connect a software management cloud 809 and the security cloud 806, which are a network inside the vehicle 800 and a network outside the vehicle. For example, the software management cloud 809 may be used to update or manage at least one software necessary for driving and managing the vehicle 800. For example, the software management cloud 809 may be linked with in-car security software 810 installed within the vehicle. For example, the in-car security software 810 may be used to provide the security function within the vehicle 800. For example, the in-car security software 810 may encrypt data transmitted and received through the in-car network using an encryption key obtained from an external authorized server to encrypt the in-vehicle network. In various embodiments, the encryption key used by the in-car security software 810 may be generated in response to the vehicle identification information (license plate or vehicle identification number (VIN)) or information uniquely assigned to each user (e.g., user identification information).

In various embodiments, the gateway 805 may transmit data encrypted by the in-car security software 810 based on the encryption key to the software management cloud 809 and/or the security cloud 806. The software management cloud 809 and/or the security cloud 806 may identify from which vehicle or which user the data has been received by decrypting encrypted data using a decryption key capable of decrypting the data encrypted by the encryption key of the in-vehicle security software 810. For example, since the decryption key is a unique key corresponding to the encryption key, the software management cloud 809 and/or the security cloud 806 may identify the transmitter of the data (e.g., the vehicle or the user) based on the data decrypted through the decryption key.

For example, the gateway 805 may be configured to support in-car security software 810 and may be associated with the control device 700. For example, the gateway 805 may be associated with the control device 700 to support a connection between the control device 700 and a client device 807 connected to the security cloud 806. In another example, the gateway 805 may be associated with the control device 700 to support a connection between the control device 700 and the third-party cloud 808 connected to the security cloud 806. However, the present disclosure is not limited to the specific description above.

In various embodiments, the gateway 805 may be used to connect the vehicle 800 with a software management cloud 809 for managing the operating software of the vehicle 800. For example, the software management cloud 809 may monitor whether an update of the operating software of the vehicle 800 is required and provide data for updating the operating software of the vehicle 800 through the gateway 805 based on the monitoring that an update of the operating software of the vehicle 800 is required. In another example, the software management cloud 809 may receive a user request requesting an update of the operating software of the vehicle 800 from the vehicle 800 through the gateway 805 and provide data for updating the operating software of the vehicle 800 based on the received user request. However, the present disclosure is not limited to the specific description above.

Figure 9:
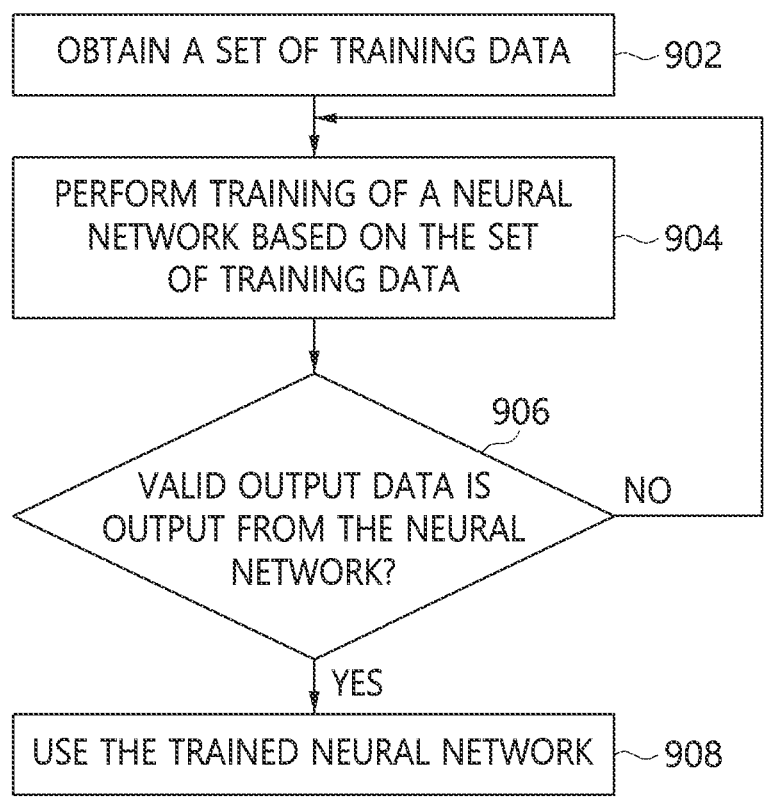
FIG. 9 is a diagram for explaining an operation of an electronic device that trains a neural network based on a set of training data according to an embodiment of the present disclosure.

FIG. 9 illustrates the operation of an electronic device 101 training a neural network based on a training dataset according to one embodiment.

Referring to FIG. 9, in the step 902, the electronic device according to one embodiment may obtain a training dataset. The electronic device may obtain a set of training data for supervised learning. The training data may include a pair of input data and ground truth data corresponding to the input data. The ground truth data may represent output data to be obtained from a neural network that has received input data that is a pair of the ground truth data.

For example, when a neural network is trained to recognize an image, training data may include images and information on one or more subjects included in the images. The information may include a category or class of a subject identifiable through an image. The information may include the position, width, height, and/or size of a visual object corresponding to the subject in the image. The set of training data identified through the operation of step 902 may include a plurality of training data pairs. In the above example of training a neural network for image recognition, the set of training data identified by the electronic device may include a plurality of images and ground truth data corresponding to each of the plurality of images.

Referring to FIG. 9, in the step 904, the electronic device according to one embodiment may perform training on a neural network based on a set of training data. In one embodiment in which the neural network is trained based on supervised learning, the electronic device may provide input data included in the training data to an input layer of the neural network. An example of a neural network including the input layer will be described with reference to FIG. 10. From the output layer of the neural network that has received the input data through the input layer, the electronic device may obtain output data of the neural network corresponding to the input data.

In one embodiment, the training in the step 904 may be performed based on a difference between the output data and the ground truth data included in the training data and corresponding to the input data. For example, the electronic device may adjust one or more parameters (e.g., weights described later with reference to FIG. 13) related to the neural network to reduce the difference based on the gradient descent algorithm. The operation of the electronic device that adjusts one or more parameters may be referred to as the tuning of the neural network. The electronic device may perform tuning of the neural network based on the output data using a function defined to evaluate the performance of the neural network, such as a cost function. A difference between the output and ground truth data may be included as one example of the cost function.

Referring to FIG. 9, in the step 906, the electronic device according to one embodiment may identify whether valid output data is output from the neural network trained in the step 904. That the output data is valid may mean that a difference (or a cost function) between the output and ground truth data satisfies a condition set to use the neural network. For example, when the average value and/or the maximum value of the differences between the output and ground truth data is less than or equal to a predetermined threshold value, the electronic device may determine that valid output data is output from the neural network.

When valid output data is not output from the neural network (No in the step 906), the electronic device may repeatedly perform training of the neural network based on the operation of the step 904. The embodiment is not limited to the specific description, and the electronic device may repeatedly perform the operations of steps 902 and 904.

When valid output data is obtained from the neural network (Yes in the step 906), the electronic device according to one embodiment may use the trained neural network based on the operation of the step 908. For example, the electronic device may provide input data different from those supplied to the neural network as training data. The electronic device may use the output data obtained from the neural network that has received the different input data as a result of performing inference on the different input data based on the neural network.

Figure 10:
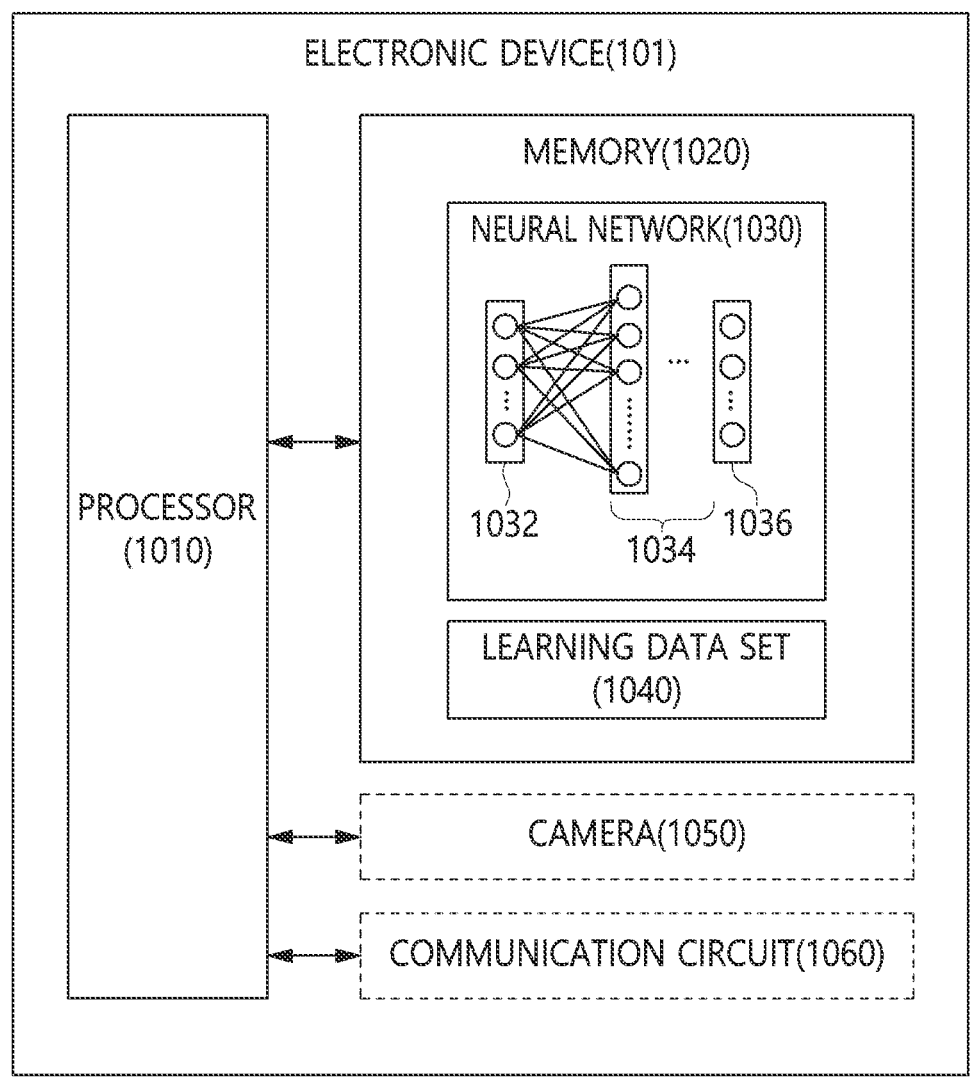
FIG. 10 is a block diagram illustrating an electronic device according to an embodiment of the present disclosure.

FIG. 10 is a block diagram of an electronic device 101 according to one embodiment.

Referring to FIG. 10, the processor 1010 of the electronic device 101 may perform computations related to the neural network 1030 stored in the memory 1020. The processor 1010 may include at least one of a center processing unit (CPU), a graphic processing unit (GPU), or a neural processing unit (NPU). The NPU may be implemented as a chip separate from the CPU or integrated into the same chip as the CPU in the form of a system on a chip (SoC). The NPU integrated into the CPU may be referred to as a neural core and/or an artificial intelligence (AI) accelerator.

Referring to FIG. 10, the processor 1010 may identify the neural network 1030 stored in the memory 1020. The neural network 1030 may include a combination of an input layer 1032, one or more hidden layers 1034 (or intermediate layers), and output layers 1036. The layers above (e.g., the input layer 1032, one or more hidden layers 1034, and the output layer 1036) may include a plurality of nodes. The number of hidden layers 1034 may vary depending on embodiments, and the neural network 1030 including a plurality of hidden layers 1034 may be referred to as a deep neural network. The operation of training the deep neural network may be referred to as deep learning.

In one embodiment, when the neural network 1030 has a structure of a feed-forward neural network, a first node included in a specific layer may be connected to all of the second nodes included in a different layer before the specific layer. In the memory 1020, parameters stored for the neural network 1030 may include weights assigned to the connections between the second nodes and the first node. In the neural network 1030 having the structure of a feed-forward neural network, the value of the first node may correspond to a weighted sum of values assigned to the second nodes, which is based on weights assigned to the connections connecting the second nodes and the first node.

In one embodiment, when the neural network 1030 has a convolutional neural network structure, a first node included in a specific layer may correspond to a weighted sum of part of the second nodes included in a different layer before the specific layer. Part of the second nodes corresponding to the first node may be identified by a filter corresponding to the specific layer. Parameters stored for the neural network 1030 in the memory 1020 may include weights representing the filter. The filter may include, among the second nodes, one or more nodes to be used to compute the weighted sum of the first node and weights corresponding to each of the one or more nodes.

The processor 1010 of the electronic device 101 according to one embodiment may perform training on the neural network 1030 using the training dataset 1040 stored in the memory 1020. Based on training data set 1040, the processor 1010 may adjust one or more parameters stored in memory 1020 for the neural network 1030 by performing the operations described with reference to FIG. 9.

The processor 1010 of the electronic device 101 according to one embodiment may use the neural network 1030 trained based on the training data set 1040 to perform object detection, object recognition, and/or object classification. The processor 1010 may input images (or video) captured through the camera 1050 to the input layer 1032 of the neural network 1030. Based on the input layer 1032 which has received the images, the processor 1010 may sequentially obtain the values of nodes of the layers included in the neural network 1030 and obtain a set of values of nodes of the output layer 1036 (e.g., output data). The output data may be used as a result of inferring information included in the images using the neural network 1030. The embodiment is not limited to the specific description above, and the processor 1010 may input images (or video) captured from an external electronic device connected to the electronic device 101 through the communication circuit 1060 to the neural network 1030.

In one embodiment, the neural network 1030 trained to process an image may be used to identify a region corresponding to a subject in the image (object detection) and/or the class of the subject expressed in the image (object recognition and/or object classification). For example, the electronic device 101 may use the neural network 1030 to segment a region corresponding to the subject within the image based on a rectangular shape such as a bounding box. For example, the electronic device 101 may use the neural network 1030 to identify at least one class matching the subject from among a plurality of designated classes.

Meanwhile, the above-described electronic device 100 may provide a notification related to a parking environment based on image reading. The notification related to the parking environment may include at least one of a notification related to towing, a notification related to a driving state, and a notification related to a parking state.

As an example of notification regarding the parking environment, the existing GPS and acceleration sensor (or G-sensor) based parking towing notification method is inaccurate due to the sensitivity of the GPS, the accuracy of the GPS in shaded areas, and/or the accuracy/error of the G-sensor. A parking tow notification may occur. Additionally, as another example of a notification regarding the parking environment, in the case of a type of vehicle that does not have a junction box or fuse box, or a vehicle that does not have ACC (accessory) wiring/power, a notification regarding the parking status does not occur, or there may be cases where inaccurate notifications about parking status occur.

Hereinafter, a function of providing a towing notification based on image processing/detection will be proposed. Specifically, a function of providing a notification related to towing will be described with reference to FIGS. 11 to 17, and a function of providing a notification related to a driving and parking condition will be described with reference to FIGS. 18 to 23.

Figure 11:
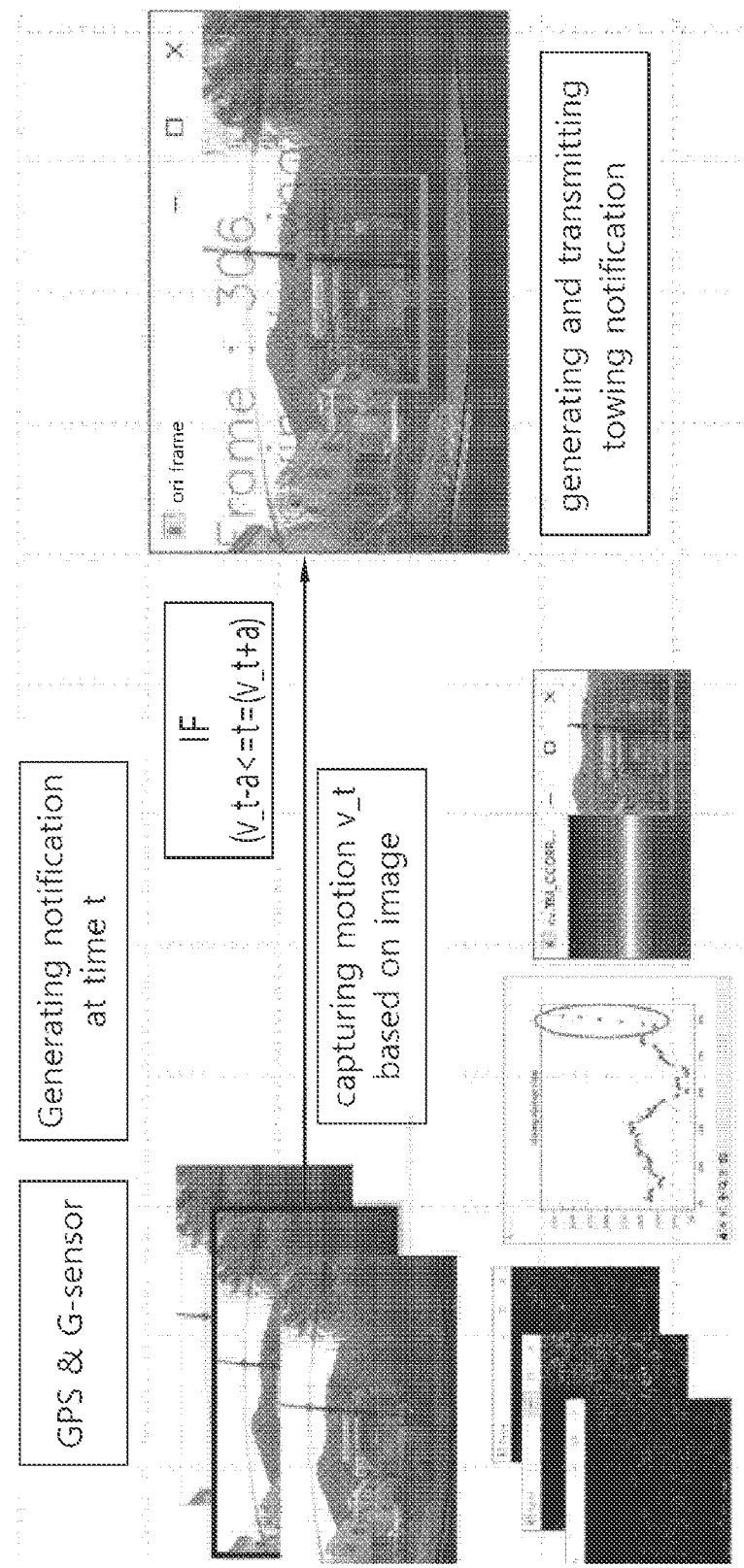
FIG. 11 is a diagram illustrating a sequence of executing towing notification according to an embodiment of the present disclosure.

FIG. 11 is a diagram illustrating a sequence of executing towing notification according to an embodiment of the present disclosure.

Referring to FIG. 11, the vehicular electronic device 100 may provide an accurate towing notification by compensating an error in detection of a GPS sensor and an acceleration sensor (G-sensor) based on image reading. For example, when a notification is generated in the GPS sensor and the acceleration sensor for a time t at which a motion occurs, the electronic device 100 may read an image captured at a corresponding time period and capture a motion $v\_t$ of the time period t based on the image. In addition, by comparing the motion v_t with a motion v_t−a of a previous time period and by comparing the motion v_t with a motion v_t+a of a subsequent time period, a towing notification may be generated and transmitted.

The vehicular electronic device 100 may estimate a motion for each time point by calculating a moving average using a magnitude of motion in an image subtraction. A motion may be used to have the same meaning as the term "movement". The image subtraction may be motion information acquired by comparing a frame at a current time point with a frame at a previous time point. When a motion included in the image subtraction is captured with a value larger than a predetermined reference, the vehicular electronic device 100 may generate a trigger signal after comparing the captured motion with sensor data of a time period (time t) in which the motion occurred. The sensor data may be acquired from a sensor mounted in the vehicle or may be acquired from a sensor mounted in the vehicular electronic device 100. The vehicular electronic device 100 may compare whether or not the GPS sensor and the acceleration sensor have performed a sensing operation corresponding to a large motion at the time when the large movement occurs. The vehicular electronic device 100 may acquire a template by cropping a central region (region of interest) in an image of a time when the trigger signal is generated, and may perform template matching between subsequent frames. When a height of the region where the template is matched is increased a predetermined number of times or more, the vehicular electronic device 100 may determine that the vehicle is being towed and may transmit a towing notification.

Figure 12:
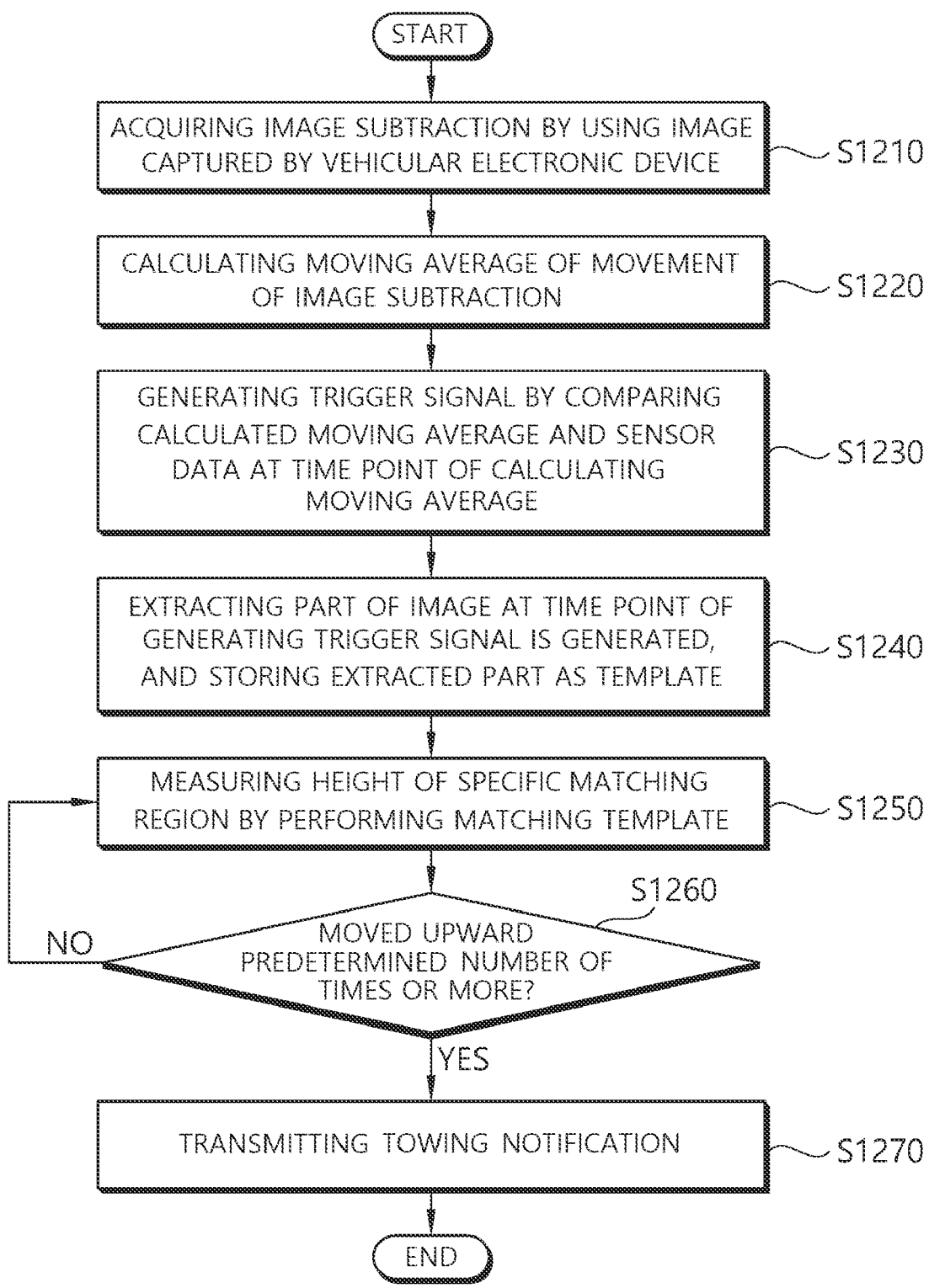
FIG. 12 is a flowchart of a method for providing a notification related to a parking environment based on image reading according to an embodiment of the present disclosure.

FIG. 12 is a flowchart of a method for providing a notification related to a parking environment based on image reading according to an embodiment of the present disclosure. Meanwhile, some of the steps in FIG. 12 may be omitted.

Referring to FIG. 12, a method of providing a notification related to a parking environment based on image reading includes operations S1210 to S1270. The method of providing a notification related to a parking environment based on image reading according to the present embodiment will be described as operations of the vehicular electronic device 100 described with reference to FIG. 1.

In operation S1210, the vehicular electronic device 100 acquires an image subtraction from a captured image. While mounted in a vehicle, the vehicular electronic device 100 may capture an image by driving a camera. The vehicular electronic device 100 reduces the load on image reading by downsizing the captured image, such as lowering the resolution of the captured image or removing detailed information (or detailed features) included in the captured image. Afterwards, the vehicular electronic device 100 can obtain the image subtraction using the downsized image. Here, with regard to removal of detailed information, the vehicular electronic device 100 may variably remove detailed information of the captured image according to surrounding movement. Specifically, when the surrounding movement is large, the vehicular electronic device 100 may reduce the magnification of the captured image and then remove detailed information from the captured image. For example, the image subtraction may be acquired by comparing at least two adjacent frames among a plurality of frames included in the downsized image. That is, information on movement may be acquired by comparing a frame at a current time point t with a frame at a previous time point t−1. Here, the amount of movement can be estimated based on the similarity between adjacent frames.

In operation S1220, the vehicular electronic device 100 calculates a moving average of the movement of the image subtraction. The vehicular electronic device 100 may observe a variation between the movement of the image subtraction of the time point t and the movement of the image subtraction of the time point t−1. Then, based on the observed movement, a moving average may be calculated in time order. For example, a moving average may be calculated in units of frames. Accordingly, the vehicular electronic device 100 may determine a time point when a large movement occurs.

In operation S1230, the vehicular electronic device 100 generates a trigger signal by comparing the calculated moving average with sensor data at a time point of calculating the moving average. Since the vehicular electronic device 100 determines a time point when a large movement occurs in operation S1220, it may be possible to determine whether or not sensors also detect a large movement at this time point. That is, it may be determined whether a time point when a large movement occurs in the image subtraction is identical to a time point when a large movement is detected in the sensor data of the sensor. When the vehicular electronic device 100 determines for the vehicle to have moved according to the result of calculating the moving average and when the vehicular electronic device 100 determines for the vehicle to have moved based on sensor data of at least one of the GPS sensor and the acceleration sensor at a time point where a moving average is calculated, the vehicular electronic device 100 may generate a trigger signal. In other words, a trigger signal may be generated when the result of calculating the image subtraction and the sensor data both indicate that the vehicle have moved. If only one of the image subtraction and the sensor data indicates that the vehicle has moved, the vehicular electronic device 100 may compare an image subtraction and sensor data at different times without generating a trigger signal.

In operation S1240, the vehicular electronic device 100 extracts a part of the image at a time of generating the trigger signal and stores the extracted part as a template. The vehicular electronic device 100 may crop a region of interest in an image and store the cropped region as a template. Here, the region of interest in the image may be a region located at the center of the image. That is, the central region of the image may be cropped out as a template. The vehicular electronic device 100 may crop a region of interest based on a preset template shape and size and store the cropped region as a template.

In operation S1250, the vehicular electronic device 100 matches an image and the template within a search region and measures a height of a specific region where the image matches the template. The vehicular electronic device 100 may set a search region in an image. Here, the search region may be the entire image, and the vehicular electronic device 100 may divide the image into grids, segmenting into a plurality of regions, and perform an operation of matching a template to each region. For example, considering that the template is generated based on a region located at the center of an image, if template matching is repeated on each of a plurality of regions, it is possible to identify that a specific region matched with the template is a region located at the center of a corresponding image. When the specific region (the central region of an image) is identified, the vehicular electronic device 100 may measure whether a difference between a height of the specific region and the height of the template exceeds a threshold value. That is, it may be determined whether the vehicle moves in an up-and-down direction by the difference between the height of the specific region and the height of the template.

In operation S1260, the vehicular electronic device 100 counts the number of times the height is measured. In fact, when connecting a vehicle to a tow car, the vehicle may up and down during fastening of a tow hook. The vehicular electronic device 100 may count the number of times of measurement as to whether a height difference between the height of the specific region and the template exceeds the threshold value. When the counted number of times does not exceed the threshold value, the vehicular electronic device 100 may continuously measure the difference between the height of the specific region and the height of the template. That is, the vehicular electronic device 100 may count instances, by time periods, of the vehicle shaking up and down to a predetermined extent or beyond or the vehicle's height being increased to a predetermine extent or beyond, and may determine whether the counted instances exceeds a threshold value.

In operation S1270, the vehicular electronic device 100 transmits a towing notification. The vehicular electronic device 100 may determine that the vehicle is being towed when the counted number of times of measurements exceeds the preset threshold number. The vehicular electronic device 100 may transmit a towing notification for the vehicle determined to be towed. The tow notification may include at least one of a video, a text, and a voice associated with a tow time point and a tow location. The vehicular electronic device 100 may transmit information on the towing notification to a vehicle service providing server 200. In addition, a towing notification may be transmitted to a user terminal device 300 through the vehicle service providing server 200.

Figure 13:
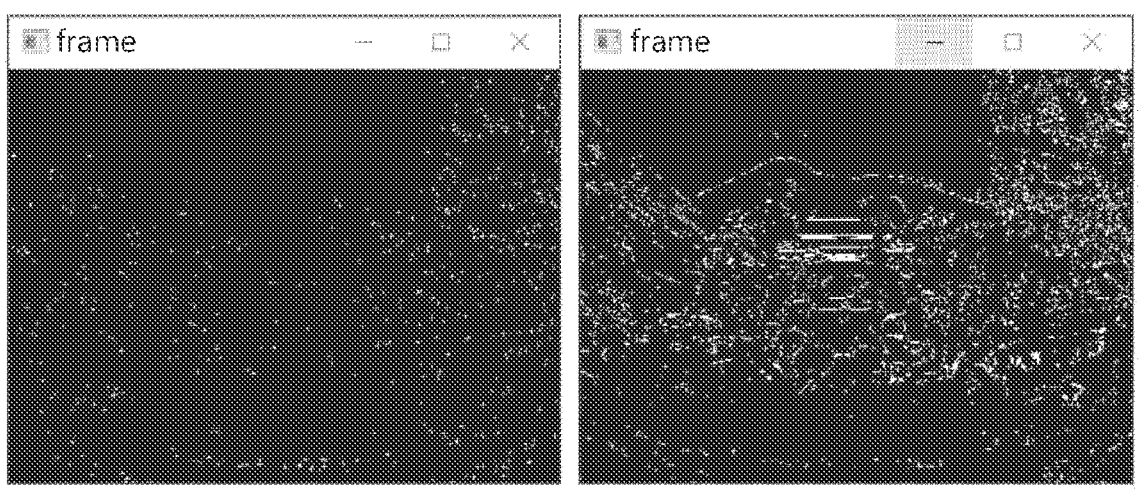
FIG. 13 shows an example of acquiring an image subtraction.

FIG. 13 shows an example of acquiring an image subtraction.

Referring to FIG. 13, the vehicular electronic device 100 may first perform image downsizing on an image in order to detect a motion in an image based on an image subtraction and template matching. By removing detailed information (or detailed features) included in an image through image downsizing, information unnecessary for motion detection may be removed. For example, the image may be downsized to ⅙. The vehicular electronic device 100 may variably determine the downsizing rate according to a motion in the surroundings. For example, if a motion in the surroundings is large, the downsizing rate may be reduced to remove detailed features.

Meanwhile, the vehicular electronic device 100 may acquire an image subtraction by comparing at least two adjacent frames among a plurality of frames included in a downsized image. For example, an image subtraction may be acquired by comparing a frame at a time point t (the frame on the right side in FIG. 13) and a frame at a time point t−1 (the frame on the left side in FIG. 13). Although the frame at the time t and the frame at the time t−1 have been described as examples, adjacent frames of different time points may also be used to generate an image subtraction. For example, an image subtraction may be acquired by comparing the frame of time t with the frame at time t+1. The vehicular electronic device 100 may acquire an image subtraction, which is information used to estimate a movement, by using a high similarity between adjacent frames. Furthermore, a image subtraction may be obtained through similarity comparison between a plurality of arbitrary frames.

Meanwhile, as the motion increases in the acquired image subtraction, a white area (or white pixel) may increase. The vehicular electronic device 100 may estimate a movement of the image subtraction based on the number of white pixels among a plurality of pixels included in the image subtraction. The vehicular electronic device 100 may store a reference value for the number of pixels in order to estimate the movement of the image subtraction, and compare the number of white pixels included in the image subtraction with the reference value to determine whether the movement is large or small. Alternatively, the vehicular electronic device 100 may store a reference value for the amount of change in the number of white pixels to estimate the amount of movement of the image subtraction, and determine whether the amount of movement is large or small by comparing the amount of change in the number of white pixels included in the image subtraction with the reference value.

Figure 14:
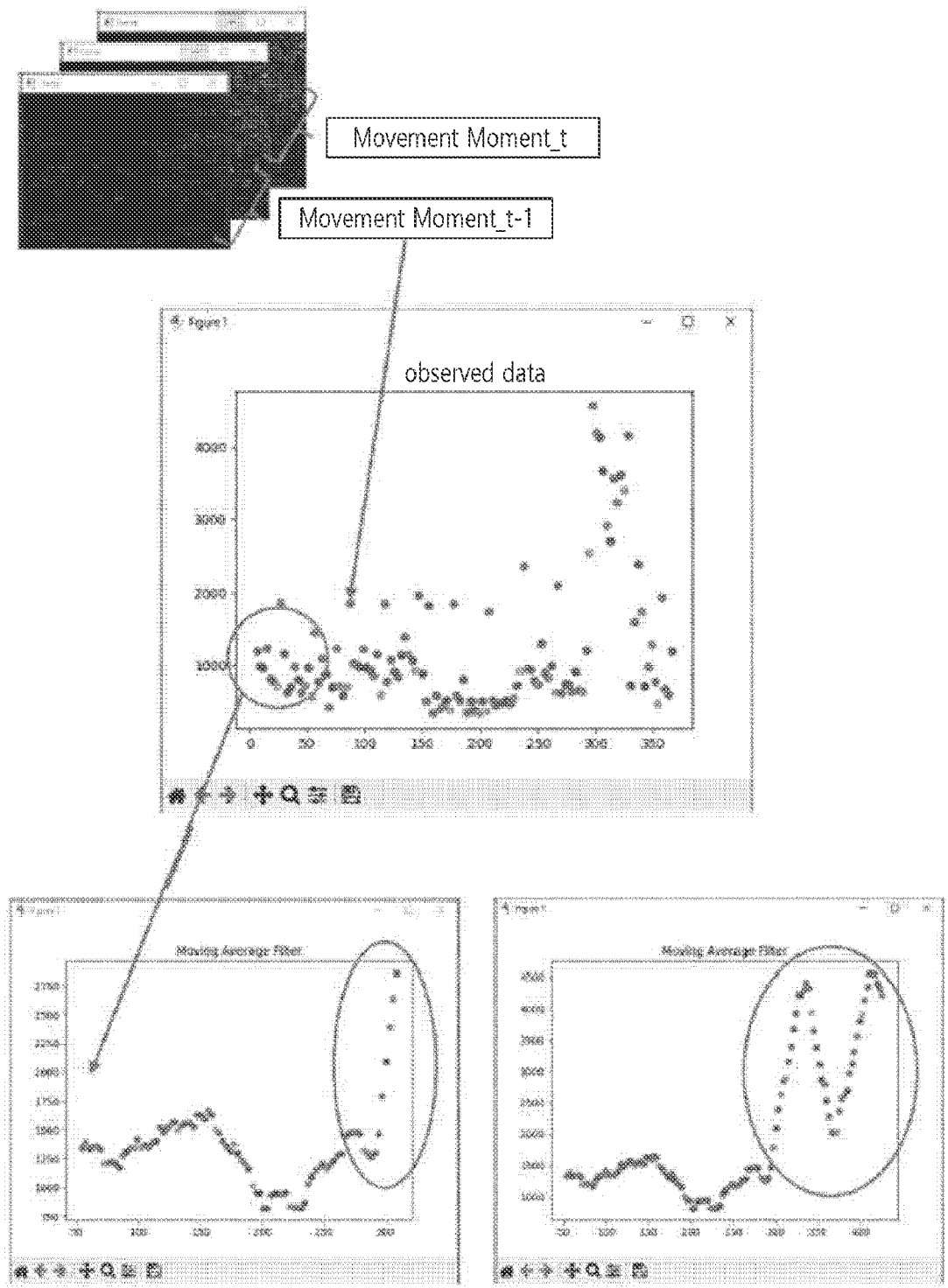
FIG. 14 shows an example of calculating a moving average of movement.

FIG. 14 shows an example of calculating a moving average of movement.

Referring to FIG. 14, when a vehicle is being towed and moves up and down, a point where a momentum greatly changes in consideration of the movement may be created in the image subtraction. The upper part of FIG. 14 shows image subtractions in which movement moments of different time points are considered, and the vehicular electronic device 100 may observe and mark a point where a momentum greatly or rapidly changes.

In the middle graph of FIG. 14, the observed data indicates a movement variation observed in image subtractions, and may be used as data for calculating a moving average by n units in time order.

Meanwhile, the vehicular electronic device 100 may calculate a moving average in time order based on the observed movement. For example, a moving average may be calculated by applying a moving average filter to the observed data. The lower graph of FIG. 14 shows the result of applying the moving average filter, and one point on the graph represents the average of n data movement. That is, as described above, it is possible to identify a point at which a momentum greatly or rapidly changes.

Meanwhile, the vehicular electronic device 100 may estimate a confidence interval for the moving average. The confidence interval is a statistical technique to probabilistically show the range within which a parameter is likely to be. Based on performing linear regression on n data of one point, the vehicular electronic device 100 may estimate at least one of a slope, an intercept, and a confidence interval for a moving average. The confidence interval may be generally set to 95% (2 sigma). Of course, the confidence interval may also be set to 99% (3 sigma) to provide a more precise towing notification. The confidence interval value may be determined based on the reference value, the degree of image downsizing, the time interval between frames, etc.

As an example, the vehicular electronic device 100 may determine that the vehicle has actually moved when subsequent data is greater than an upper bound (mean+2 sigma) of a previously calculated confidence interval. That is, a motion of the vehicle may be determined under the assumption that the distribution of moving average values approaches a normal distribution according to the Central Limit Theorem (CLT). As such, when a motion is determined based on image subtractions and also detected in sensor data at the same time point, the vehicular electronic device 100 may generate a trigger signal.

Figure 15:
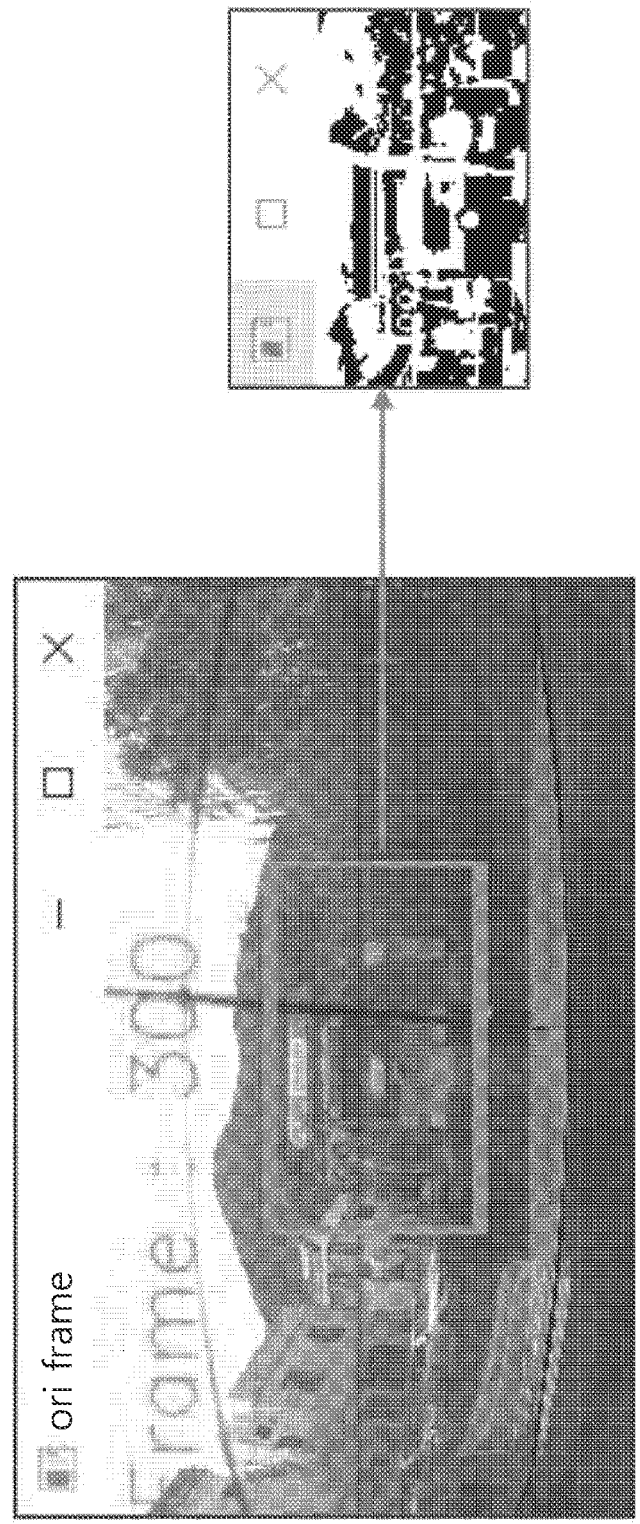
FIG. 15 shows an example of storing a template.

FIG. 15 shows an example of storing a template.

Referring to FIG. 15, after generating a trigger signal, the vehicular electronic device 100 may crop a region of interest in the center of an image and store the template in order to sense an actual vertical movement of the vehicle by using the region of interest at the center of the image. As an example, a template may be cropped to have a width of 0.3*width to 0.7*width of the image and have a height of 0.3*height to 0.7*height of the image. That is, the template may be a region of 0.4 in a width and a height.

Figure 16:
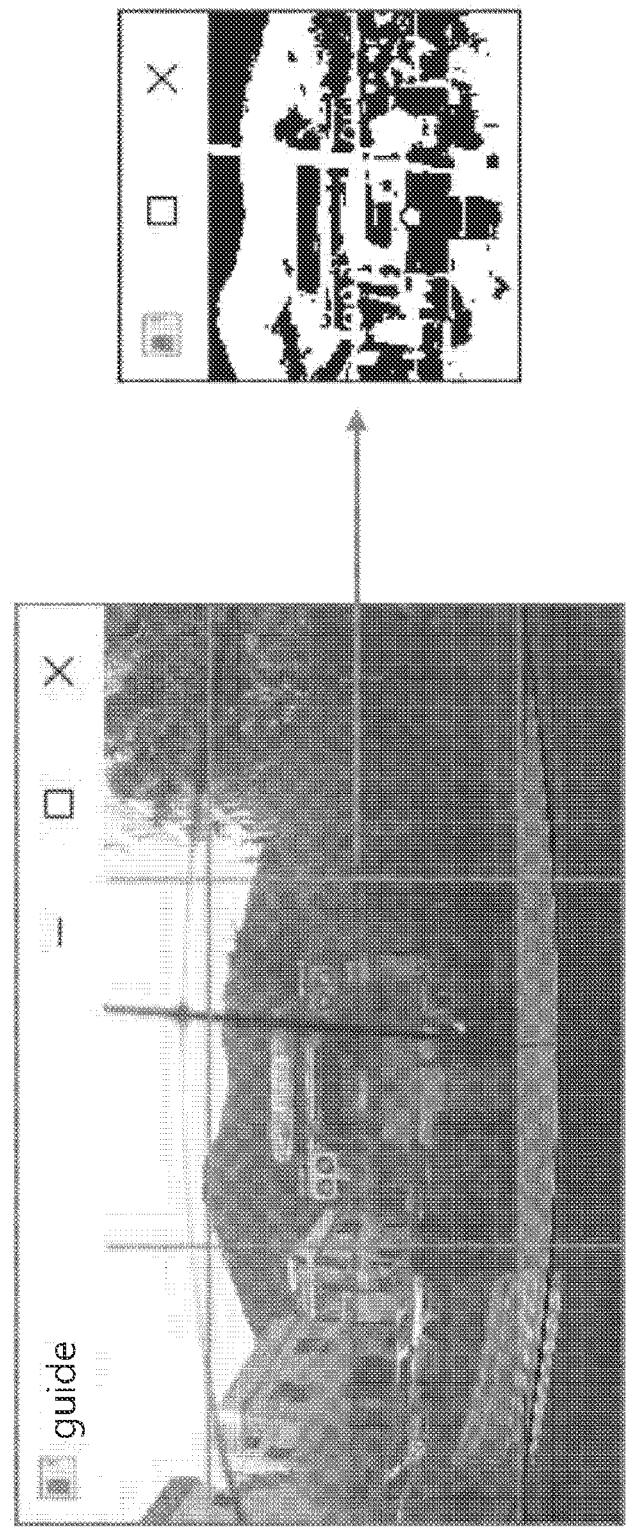
FIG. 16 shows an example of executing template matching within a search region.

FIG. 16 shows an example of executing template matching within a search region.

Referring to FIG. 16, the vehicular electronic device 100 may set a search region in an image. As an example, the search region may be cropped to have a width of 0.3*width to 0.7*width of the image and have a height of 0.2*height to 0.8*height of the image. That is, the search region may have a region of 0.4 in a width and 0.6 in height. The size of the template and the search region may be variable. For example, the template and a region of search section may be adjusted when an image includes the bonnet, trunk, or sky. Here, since a fixed region is not necessary in the case of the bonnet or trunk. In the case of areas containing the sky, relative movement is small, so areas containing the sky may also be excluded from the template and the region of search section to reduce errors in height measurement. As in the example above, the template and the region of search section can be adjusted depending on the situation to improve the accuracy of notifications about the parking environment.

Meanwhile, the vehicular electronic device 100 may perform template matching within the search region to identify a specific region (central region of the image) matching the template, and may measure a height of the specific region. At this time, when the vehicle moves in one direction (for example, upward) a certain number of times as a result of template matching, the vehicular electronic device 100 may determine that the vehicle is being towed and transmit a towing notification. Here, region operations such as correlation and convolution may be used to perform template matching. For example, Normalized Cross Correlation (NCC) can be used for template matching. The following equation 1 is an NCC equation applicable to each pixel (x, y). Where R is the radius of the template, H=h(i, j) is the template, and F=f(x+i, y+j) is the image patch.

$$NCC(x, y) = \frac{\text{Correlation}}{\text{Length of image patch} \cdot \text{Length of template}} \Rightarrow \quad [\text{Equation 1}]$$

$$NCC(x, y) = \frac{\sum_{j=-R}^{R}\sum_{i=-R}^{R}(H \cdot F)}{\sqrt{\sum_{j=-R}^{R}\sum_{i=-R}^{R}(F \cdot F)} \cdot \sqrt{\sum_{j=-R}^{R}\sum_{i=-R}^{R}(H \cdot H)}}$$

Figure 17:
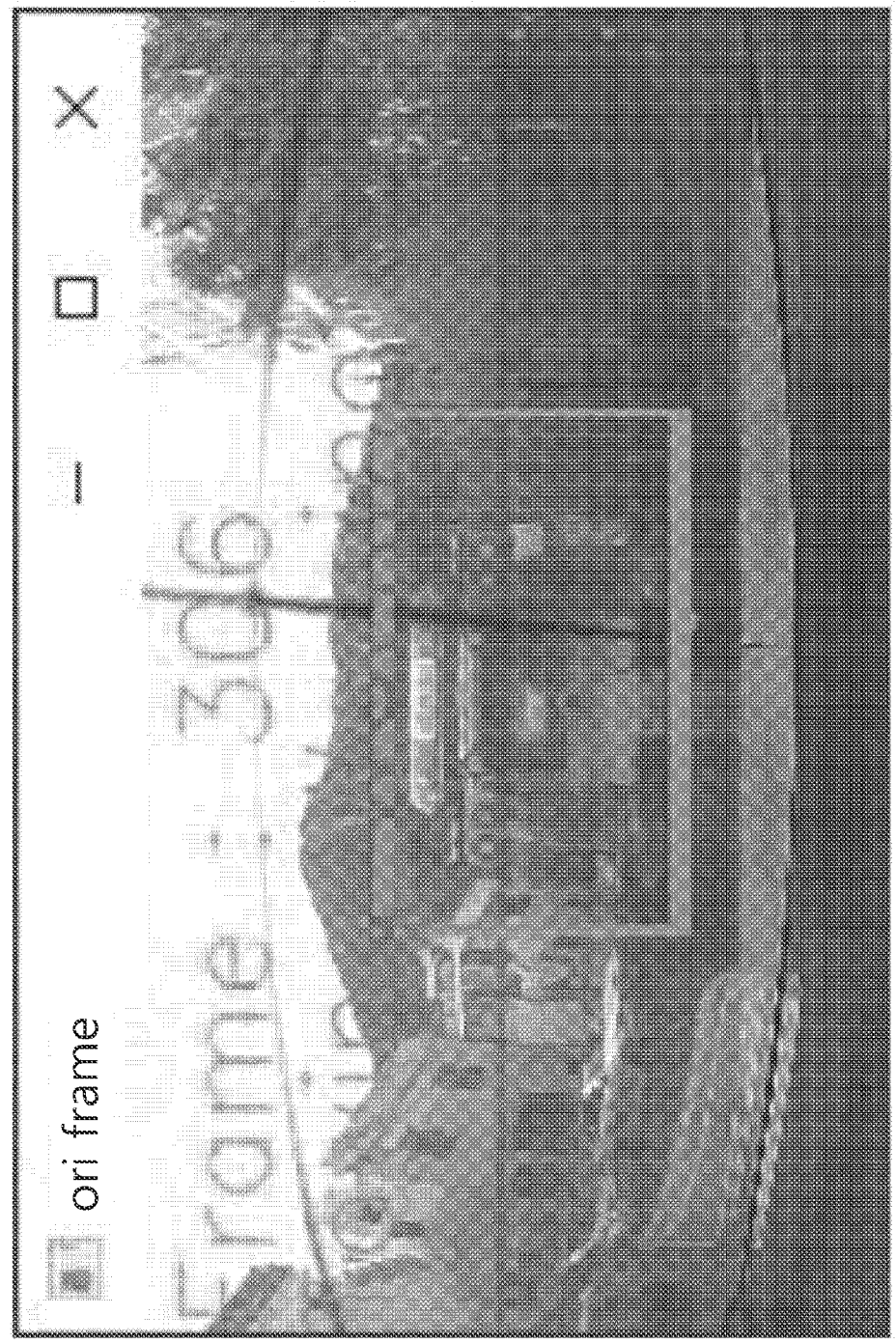
FIG. 17 shows an example of an image reading result.

FIG. 17 shows an example of an image reading result.

Referring to FIG. 17, as the number of height measurements exceeds a threshold value, the vehicular electronic device 100 may determine that the vehicle is actually being towed, and then transmit a towing notification. The towing notification may be transmitted to the user terminal device 300 through the vehicle service providing server 200. As shown in FIG. 17, the vehicular electronic device 100 may transmit an image, in which a message informing of the vehicle being towed is inserted, as a towing notification. Of course, as described above, a voice or text-based towing notification may be transmitted.

Meanwhile, the function of providing a towing notification described with reference to FIGS. 11 to 17 may be implemented by some of the components of the vehicular electronic device 100 described with reference to FIG. 2. For example, the function may be implemented by the photographing unit 116, the processor 110, and the communication unit 130 of the vehicular electronic device 100. The photographing unit 116 may be implemented as a camera that captures an image. The processor 110 may be implemented as a processor that generates a towing notification based on image reading. The image reading function of the processor may be performed by the vehicle service providing server 200, instead of the processor 110 of the vehicular electronic device 100, depending on circumstances. In addition, the image analysis or reading function may be performed by inputting an image to a trained neural network described with reference to FIG. 10. The communication unit 130 may be implemented as a communication module that transmits a towing notification.

Figure 18:
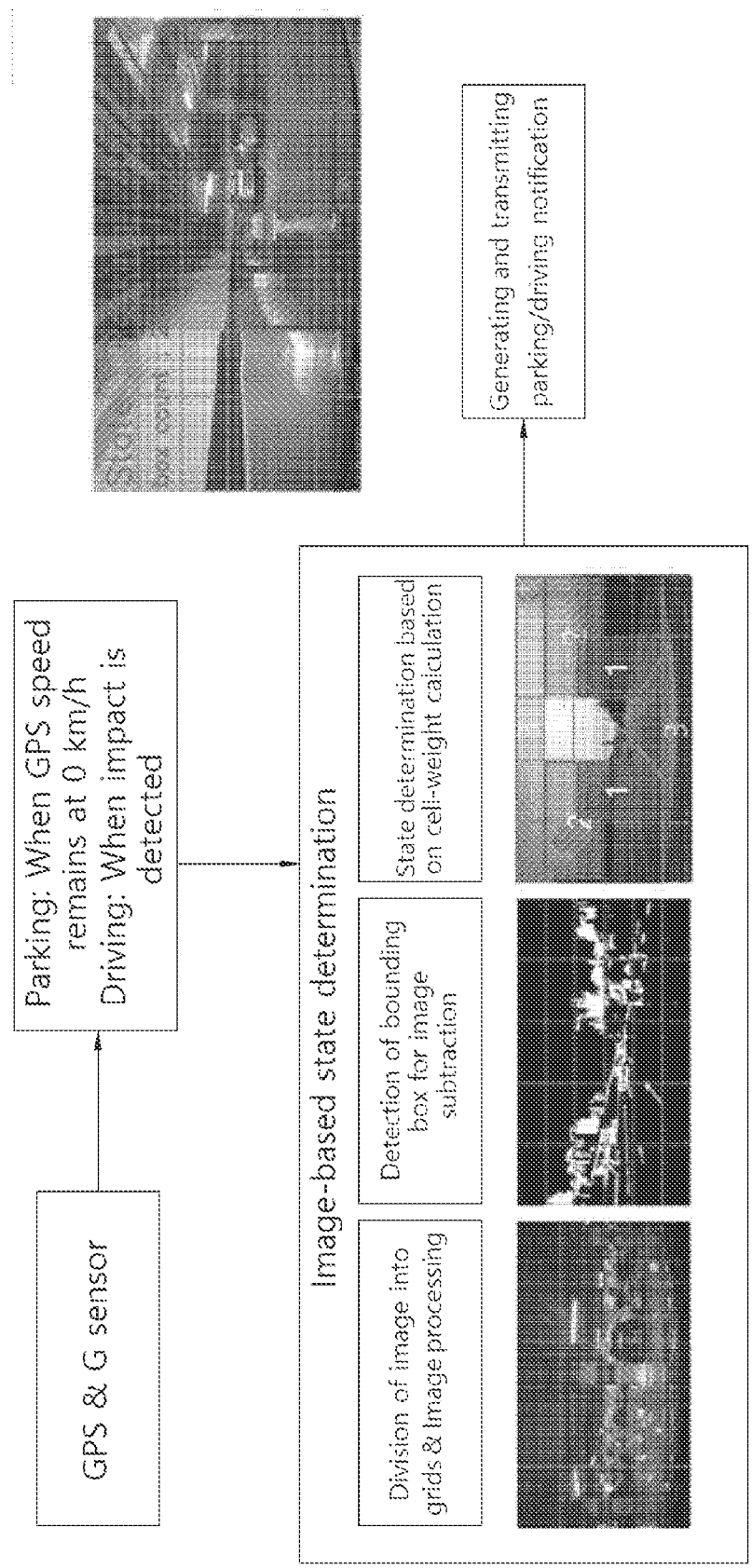
FIG. 18 shows an example of a sequence of executing an AI parking mode according to an embodiment of the present disclosure.

FIG. 18 shows an example of a sequence of executing an AI parking mode according to an embodiment of the present disclosure.

Referring to FIG. 18, the vehicular electronic device 100 may provide a notification for an accurate driving and parking state determination, by compensating an error in detection of the GPS sensor and the acceleration sensor (G-sensor) based on image reading.

The vehicular electronic device 100 may detect that a GPS speed of the vehicle continues at 0 Km/h, or may detect an impact occurring in the vehicle from the GPS sensor and the acceleration sensor. Accordingly, an image-based state determination sequence may be performed. The image-based state determination sequence may include an operation of determining a state based on image division into grids, image processing, bounding box detection for image subtraction, and weight calculation for each cell. Based on a result of the image-based state determination sequence, a notification related to a parking state or a driving state may be generated and transmitted.

The vehicular electronic device 100 may generate a plurality of cells by dividing a captured image into grids, and assign a weight to each cell. In addition, a bounding box for a region detected through image processing and image subtraction may be extracted. In addition, by correcting a weight assigned to each cell in a bounding box, it is determined whether the current state of the vehicle is a driving state or a parking state, and then a notification corresponding to a determination result may be transmitted.

Figure 19:
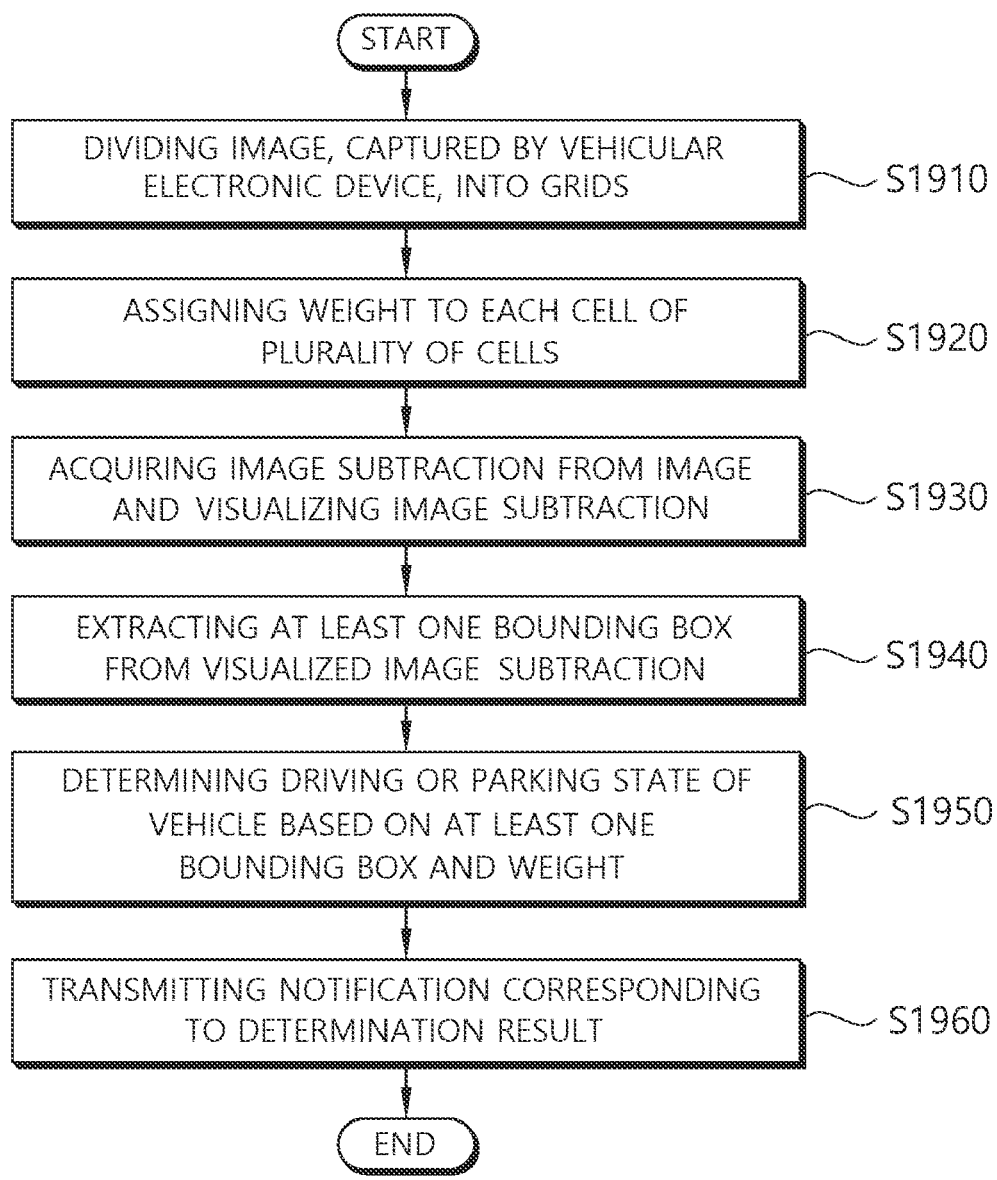
FIG. 19 is a flowchart of a method for providing a notification related to a parking environment based on image reading according to another embodiment of the present disclosure.

FIG. 19 is a flowchart of a method for providing a notification related to a parking environment based on image reading according to another embodiment of the present disclosure. Meanwhile, some of the steps in FIG. 19 may be omitted.

Referring to FIG. 19, a method of providing a notification related to a parking environment based on image reading includes operations S1910 to S1960. The method of providing a notification related to a parking environment based on image reading according to the present embodiment will be described as operations of the vehicular electronic device 100 described with reference to FIG. 1.

In operation S1910, the vehicular electronic device 100 generates a plurality of cells by dividing a captured image into grids. The vehicular electronic device 100 may perform grid segmentation to generate a plurality of cells having the same size based on an overall size of the image.

Meanwhile, the vehicular electronic device 100 may determine whether to perform operation S1910 based on sensing data of sensors prior to operation S1910. For example, if a GPS speed of the vehicle is 0 Km/h for a certain period of time or more, it may be determined that the vehicle is parking, and then operation S1910 may be performed to increase the accuracy of a determination result based on image reading. In another example, when an impact occurring in the vehicle is sensed, it may be determined that the vehicle is driving, and then operation S1910 may be performed. The vehicular electronic device 100 may first determine a state of the vehicle by using sensor data and then perform image reading to obtain a more accurate determination result.

In operation S1920, the vehicular electronic device 100 assigns a weight to each of the plurality of cells. The vehicular electronic device 100 may assign a weight to each cell in order to effectively detect a motion. For example, a weight may be assigned to at least one cell among the plurality of cells based on at least one of a field of view (FOV) of the image, a photographing location, and a target motion of an object. That is, different weights may be assigned depending on whether the field of view of the image is fixed or changes, different weights may be assigned depending on whether the photographing location is fixed or changes, and different weights may be assigned depending on whether the target motion of the object is large or small.

In another example, a first weight may be assigned to at least one cell of the plurality of cells at a position corresponding to an area in which an object and a traveling vehicle are detected a predetermined number of times or more; a second weight may be assigned to at least one cell of the plurality of cells at a position corresponding to a surrounding background and an area in which a motion of a structure is detected a predetermined number of times or more; and a third weight may be assigned to at least one cell of the plurality of cells at a position corresponding to a vehicle bumper or an area where the sky is detected a predetermined number of times or more. That is, the first weight may be assigned to a cell with a high degree of motion, the second weight may be assigned to a cell with a medium degree of motion, and the third weight may be assigned to a cell with a low degree of motion. In the above, the order of the weights is given as an example for convenience of explanation, and weights in different orders may be assigned according to a settings of the vehicular electronic device 100.

After assigning a weight to each cell, the vehicular electronic device 100 may perform image blurring or image smoothing on some cells having low weights. That is, information unnecessary to determine a vehicle state may be further reduced by applying image blurring or image smoothing to at least one cell having a low weight. For example, the vehicular electronic device 100 may perform image blurring or image smoothing by applying a filter to at least one cell to which the third weight is applied.

In operation S1930, the vehicular electronic device 100 acquires an image subtraction from the image and visualizes the image subtraction. The vehicular electronic device 100 may acquire an image subtraction in the same way as acquiring an image subtraction to provide a towing notification. That is, the image subtraction may be acquired by comparing at least two adjacent frames among a plurality of frames included in the image. The vehicular electronic device 100 may visualize the acquired image subtraction. In this case, visualizing refers to detecting a contour required to generate a bounding box. That is, rather than identifying the type of an object in the image subtraction, it may be a preprocessing operation for identifying a position and a size of the object.

In operation S1940, the vehicular electronic device 100 extracts at least one bounding box from the visualized image subtraction. The vehicular electronic device 100 may detect at least one region in which an area within a contour (an area of a detected object) included in the visualized image subtraction is equal to or greater than a predetermined size. Then, a bounding box may be generated in the detected region. For example, a bounding box may be generated for each cell by comparing whether a result of detecting a contour included in each of a plurality of cells is equal to or greater than a predetermined size. In this case, when a plurality of regions having contours of a predetermined size or more exist in one cell, a bounding box may be generated for each of the plurality of regions. That is, there may be a cell without a bounding box, a cell with one bounding box, and a cell with a plurality of bounding boxes.

In operation S1950, the vehicular electronic device 100 determines the state of the vehicle based on at least one bounding box and at least one of the weights. The vehicular electronic device 100 may determine a state of the vehicle based on at least one of the weight assigned in operation S1920 and the bounding box extracted in operation S1940. The vehicular electronic device 100 may count the number of extracted bounding boxes. Then, weights may be applied to the counted bounding boxes. In this case, a weight applied to a bounding box may be a weight given to a cell including the bounding box. The vehicular electronic device 100 may determine the state of the vehicle by determining whether a result of applying the weight to the bounding box exceeds a threshold value.

In operation S1960, the vehicular electronic device 100 transmits a notification corresponding to a determination result. The vehicular electronic device 100 may determine that the vehicle is in a driving state when a determination result of operation S1950 exceeds the threshold value. On the other hand, the vehicular electronic device 100 may determine that the vehicle is in a parking state when a determination result of operation S1950 is less than the threshold value. Without applying weights, the vehicular electronic device 100 may also determine whether the vehicle is in a driving state or a parking state only with the number of extracted bounding boxes. For example, after first determining the state of the vehicle by comparing the number of bounding boxes and the threshold value, the vehicular electronic device 100 may correct the determined state of the vehicle by comparing a result of applying weights to the bounding boxes with a threshold value.

Figure 20:
FIG. 20 shows an example of an image divided into grids.

FIG. 20 shows an example of an image divided into grids.

As shown in FIG. 20, a stopped state in an image may be determined through a preprocessing process of generating a plurality of cells by dividing an image captured by the vehicular electronic device 100 into grids. For example, a cell at a specific position in a frame at time t may be compared with a cell at a specific position in a frame at time t-1, and if an object in the cell does not move, it may be determined as a stopped state. That is, it is possible to determine whether the vehicle is stopped or not by comparing cells at the same potion.

Meanwhile, as shown in FIG. 20, the vehicular electronic device 100 may divide an image in a lattice form composed of N horizontal lines and M vertical lines. In this case, the number of horizontal and vertical lines, a spacing between lines, and a shape of the lattice may be changed according to the settings of the vehicular electronic device 100 (For example, settings by the vehicle user, settings by the manufacturer, settings according to the purpose of use, etc.)

Figure 21:
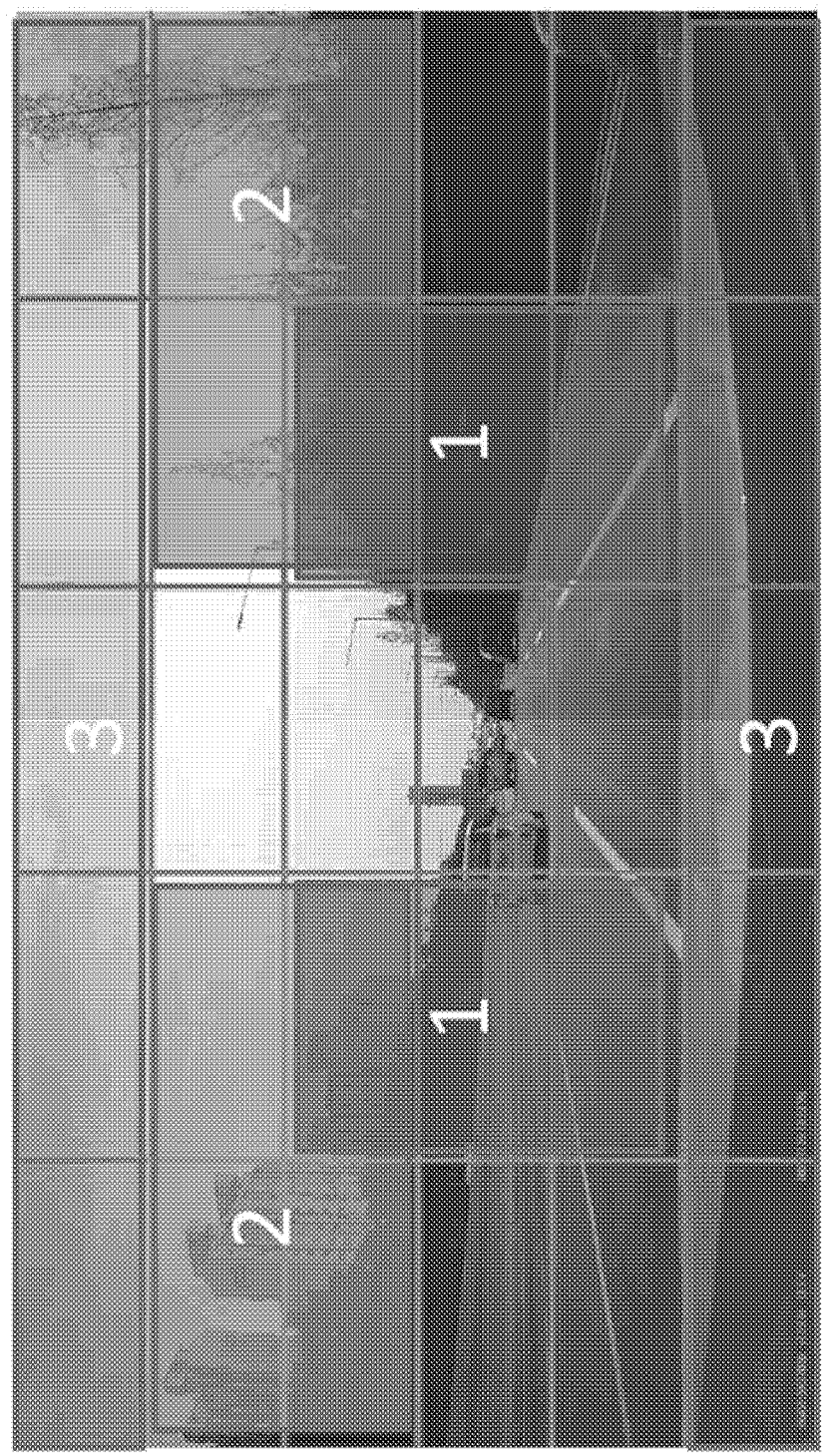
FIG. 21 shows an example in which a weight is assigned to each cell.

FIG. 21 shows an example in which a weight is assigned to each cell.

Referring to FIG. 21, a cell in which a large or a small number of objects are detected or a cell in which a large or small number of motions are detected may be generated according to a zone (position). In order to correct a value for this, a weight may be assigned to each individual cell so as to effectively detect a motion. In the example of FIG. 21, weights are set variably according to a field of view of an image, a photographing location, a target motion, and the like. Referring to FIG. 21, a first weight given to cells included in the area where a large amount of objects and moving vehicles are detected (area 1), a second weight given to cells included in the area where movement of surrounding background and structures is largely detected (area 2), a third weight given to the cells included in the area which is less related to driving, such as the vehicle bumper/top, sky, etc (area 3) are configured differently depending on the purpose of image processing, parking mode, and vehicle status. For example, when the vehicular electronic device 100 tries to more clearly determine a stop on the roadside, the weight for area 1 (i.e., the first weight) may be set to a relatively high value. And when the vehicular electronic device 100 tries to clearly determine the driving state, the weight for area 2 (i.e., the second weight) can be set to a relatively high value.

Meanwhile, the vehicular electronic device 100 may assign a weight to each cell and then apply image smoothing or image blurring to each cell. This is to acquire an image that is robust against noise, irrespective of whether or not driving of the vehicle is determined. For example, image blurring may be performed using a Gaussian filter. Such image blurring or image smoothing may be applied to each of a plurality of cells included in an image, or may be selectively applied to only some cells (cells having low weights) that are less related to a determination as to driving of the vehicle.

Figure 22:
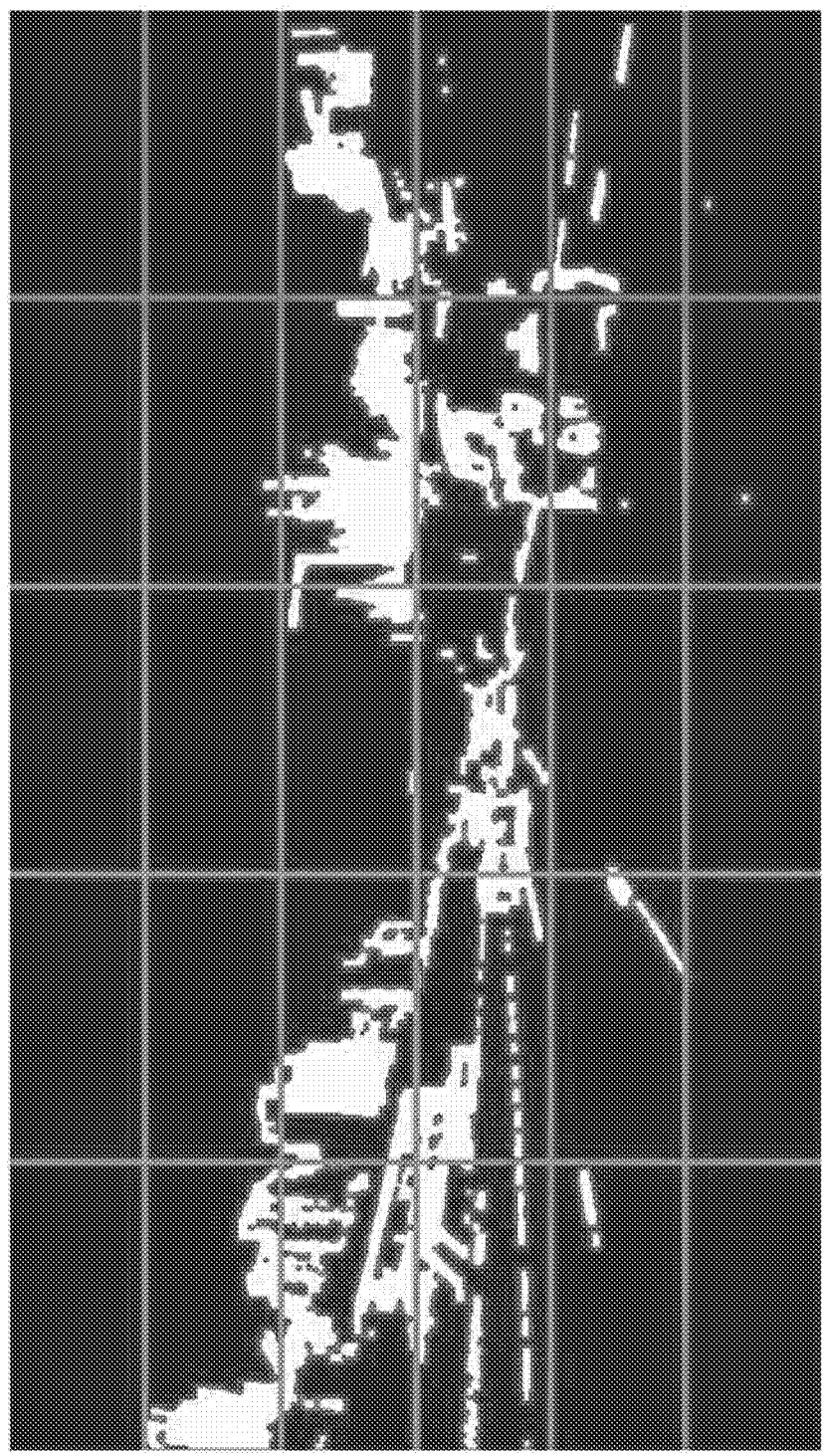
FIG. 22 shows an example of detecting a contour of an image subtraction.

FIG. 22 shows an example of detecting a contour of an image subtraction. Here, the image subtraction can be obtained by the method described above, such as in FIG. 13. For example, a image subtraction can be obtained by comparing the current frame and the previous frame in the image.

Referring to FIG. 22, the vehicular electronic device 100 may detect contours included in an image by applying a contour detection algorithm to the image. A contour included in an image may be a contour of an object such as a vehicle, a person, a traffic sign, or a building. Since the image blurring or image smoothing has been performed on the image not to detect a contour of an object (for example, the sky, etc.) unnecessary in determining a state of the vehicle, the vehicular electronic device 100 may detect only contours useful for determining the state of the vehicle. For example, the vehicular electronic device 100 may detect contours included in an image using an algorithm such as an edge detection.

Figure 23:
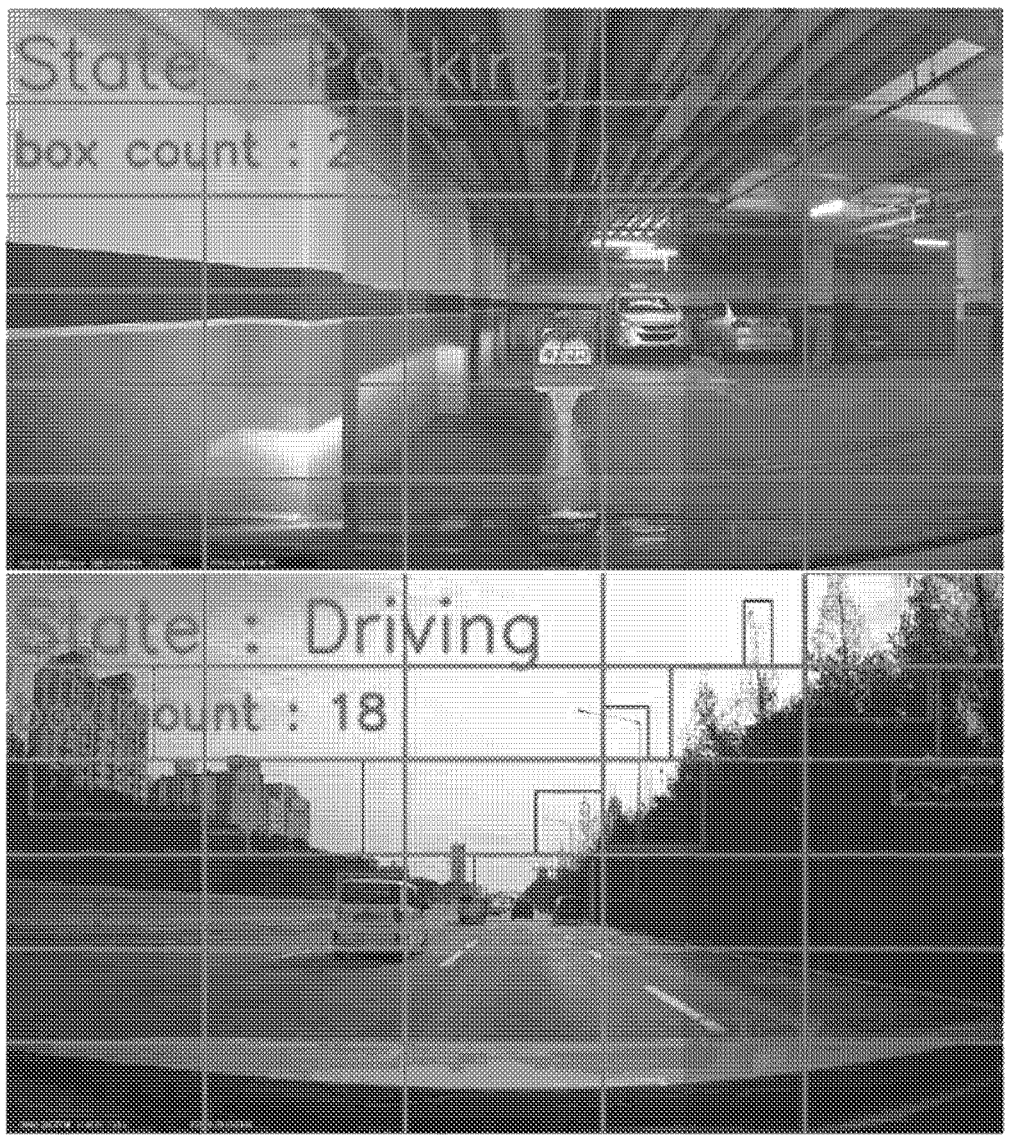
FIG. 23 shows a result of determining a vehicle state based on a weight for each cell and a bounding box.

FIG. 23 shows a result of determining a vehicle state based on a weight for each cell and a bounding box.

Referring to FIG. 23, the vehicular electronic device 100 can set a bounding box for visualization based on the contour detected in the image. Here, the bounding box may refer to a square to distinguish identified/detected objects. At this time, bounding box setting can be performed when the area within the contour is larger than a certain size.

The vehicular electronic device 100 may derive a final result value for a vehicle state determination, based on a value acquired by counting the number of bounding boxes and a weight for each cell. That is, a result value indicating whether the vehicle is in a driving state or a parking state may be derived. When the derived result value lasts for a predetermined time or more, the vehicular electronic device 100 may operate in a mode corresponding to the result value. For example, if a parking state is maintained for a predetermined time after the vehicle state is determined as a parking state, the vehicular electronic device 100 may enter a parking mode. That is, an operation to assist the driver to park the vehicle may be performed according to the parking mode. That is, when entering the parking mode, the vehicular electronic device 100 may transmit a notification informing of entering the parking mode.

Meanwhile, the function of providing notifications related to the parking state and driving state of the vehicle described with reference to FIGS. 18 to 23 may be implemented by some of the components of the vehicular electronic device 100 described with reference to FIG. 2. For example, the function may be implemented by the camera unit 116, the processor 110, and the communication unit 130 of the vehicular electronic device 100. The photographing unit 116 may be implemented as a camera that captures an image. The processor 110 may be implemented as a processor that generates notifications related to parking and driving states based on image reading. The image reading function of the processor may be performed by the vehicle service providing server 200, instead of the processor 110 of the vehicular electronic device 100, depending on circumstances. In addition, the image analysis function may be performed by inputting an image to a trained neural network described with reference to FIG. 10. The communication unit 130 may be implemented as a communication module that transmits notifications regarding a parking state and a driving state.

Meanwhile, the function of providing a towing notification described through FIGS. 11 to 17 and the function of providing a notification about the parking state and driving state of the vehicle described through FIGS. 18 to 23 are simultaneously performed by the vehicular electronic device 100. For example, the vehicular electronic device 100 may acquire images captured through a camera installed in the vehicle. Thereafter, the vehicular electronic device 100 may perform grid-type image segmentation-based pre-processing on the captured image and obtain a image subtraction. Here, based on grid-type image segmentation-based pre-processing, the vehicular electronic device 100 can determine whether it is in a stationary state. Additionally, the vehicular electronic device 100 may assign a weight to at least one cell among a plurality of cells generated by performing the grid image segmentation-based pre-processing. Thereafter, the vehicular electronic device 100 may set a template based on the image subtraction and simultaneously perform contour detection on the image subtraction. Thereafter, the vehicular electronic device 100 may determine the movement of the vehicle based on the image subtraction. Based on the above determination, the vehicular electronic device 100 can determine whether the vehicle is in a towing state, a driving state, or a parked state. Since the detailed description of each step is the same as described above, redundant description is omitted.

A vehicular electronic device and a method for improving a function related to a parking environment based on image reading according to an embodiment of the present disclosure have been described with reference to the embodiments shown in the drawings. However, the foregoing is illustrative of the present disclosure and is not to be construed as limiting thereof, and it will be understood by one of ordinary skill in the art that various changes in form and details may be made therein without departing from the spirit and scope of the invention as defined by the following claims.

What is claimed is:

1. A method performed by a vehicular electronic device in a vehicle comprising:

performing an image processing procedure on an image acquired by the vehicular electronic device, the image processing procedure including obtaining an image subtraction;

determining a state of the vehicle based on the image processing procedure, the state of the vehicle being one of a towing state, a driving state, and a parking state; and providing notification for the determined state of the vehicle, wherein the image processing procedure includes generating a plurality of cells based on grid-type image segmentation on the acquired image, and wherein the vehicular electronic device determines the state of the vehicle based on the plurality of cells.

2. The method of claim 1, wherein the grid-type image segmentation includes assigning a cell weight to at least one cell among the plurality of cells, and wherein the cell weight for the at least one cell is determined based on at least one of the state of the vehicle, an angle of view of the image, and a location for capturing the image.

3. The method of claim 1, wherein the vehicular electronic device determines an unused cell among the plurality of cells is, the unused cell being not to be used to determine the state of the vehicle, and wherein the vehicular electronic device performs at least one of image blurring and image smoothing on the unused cell.

4. The method of claim 1, wherein the image processing procedure includes detecting a contour in the image acquired by the vehicular electronic device, and wherein the vehicular electronic device determines the state of the vehicle based on the contour.

5. The method of claim 4, wherein the detecting the contour includes extracting a bounding box for an object included in the image acquired by the vehicular electronic device.

6. The method of claim 5, wherein the extracting the bounding box includes generating a bounding box in at least one area within the contour included in the image subtraction, the at least one area being larger than a predetermined size.

7. The method of claim 1, wherein the image subtraction is determined based on image downsizing of the image acquired by the vehicular electronic device and based on at least two adjacent frames among a plurality of frames included in the downsized image.

8. The method of claim 1, wherein the image subtraction indicates white pixels, the presence of which is based on an amount of the movement of the vehicle, the vehicular electronic device determines the amount of the movement of the vehicle based on the number of the white pixels, and the vehicular electronic device determines the state of the vehicle based on the amount of the movement of the vehicle.

9. The method of claim 8, wherein the vehicular electronic device determines an average movement, wherein the average movement is determined based on an amount of change between the amount of the movement of the vehicle at time t and the amount of the movement of the vehicle at time t−1.

10. A vehicular electronic device in a vehicle comprising:
a camera configured to capture an image;
a processor configured to perform an image processing procedure on the image acquired by the vehicular electronic device, the image processing procedure including obtaining an image subtraction, to determine a state of the vehicle based on the image processing procedure, the state being one of a towing state, a driving state and a parking state, and to generate a notification regarding the determined state of the vehicle; and a communication module configured to transmit the notification, wherein the image processing procedure includes generating a plurality of cells based on grid-type image segmentation on the acquired image, and wherein the vehicular electronic device determines the state of the vehicle based on the plurality of cells.

11. The vehicular electronic device of claim 10, wherein the processor is further configured such that the grid-type image segmentation includes assigning a cell weight to at least one cell among the plurality of cells, and wherein the cell weight for the at least one cell is determined based on at least one of the state of the vehicle, an angle of view of the image, and a location for capturing the image.

12. The vehicular electronic device of claim 10, wherein the processor is further configured to determine an unused cell among the plurality of cells is, the unused cell being not to be used to determine the state of the vehicle, and wherein the processor is further configured to perform at least one of image blurring and image smoothing on the unused cell.

13. The vehicular electronic device of claim 10, wherein the image processing procedure includes detecting a contour in the image acquired by the vehicular electronic device, and wherein the vehicular electronic device determines the state of the vehicle based on the contour.

14. The vehicular electronic device of claim 13, wherein the detecting the contour includes extracting a bounding box for an object included in the image acquired by the vehicular electronic device.

15. The vehicular electronic device of claim 14, wherein the processor is further configured such that the extracting the bounding box includes generating a bounding box in at least one area within the contour included in the image subtraction, the at least one area being larger than a predetermined size.

16. The vehicular electronic device of claim 10, wherein the image subtraction is determined based on image downsizing of the image acquired by the vehicular electronic device and based on at least two adjacent frames among a plurality of frames included in the downsized image.

17. The vehicular electronic device of claim 10, wherein the image subtraction indicates white pixels, the presence of which is based on an amount of the movement of the vehicle, the vehicular electronic device determines the amount of the movement of the vehicle based on the number of the white pixels, and the vehicular electronic device determines the state of the vehicle based on the amount of the movement of the vehicle.

18. The vehicular electronic device of claim 17, wherein the processor is further configured to determine an average movement, wherein the average movement is determined based on an amount of change between the amount of the movement of the vehicle at time t and the amount of the movement of the vehicle at time t−1.

* * * * *